US012751460B2

(12) United States Patent
Kim

(10) Patent No.: US 12,751,460 B2
(45) Date of Patent: Oct. 6, 2026

(54) COMPOSITION TARGETING V-ATPASE FOR CONTROLLING *FRANKLINIELLA OCCIDENTALIS* AND METHOD OF CONTROLLING *FRANKLINIELLA OCCIDENTALIS* USING SAME

(71) Applicant: Andong National University Industry-Academic Cooperation Foundation, Andong-si (KR)

(72) Inventor: Yong Gyun Kim, Andong-si (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 215 days.

(21) Appl. No.: 18/483,953

(22) Filed: Oct. 10, 2023

(65) Prior Publication Data

US 2024/0206478 A1 Jun. 27, 2024

(30) Foreign Application Priority Data

Dec. 26, 2022 (KR) ........................ 10-2022-0184272

(51) Int. Cl.
*A01N 63/60* (2020.01)
*A01N 25/04* (2006.01)
*A01P 7/04* (2006.01)

(52) U.S. Cl.
CPC ............. *A01N 63/60* (2020.01); *A01N 25/04* (2013.01); *A01P 7/04* (2021.08)

(58) Field of Classification Search
CPC ........ A01N 63/60; A01N 25/04; A01N 57/16; A01N 25/006; A01P 7/04
See application file for complete search history.

(56) References Cited

FOREIGN PATENT DOCUMENTS

KR 10-2013-0130804 A 12/2013
KR 10-2013-0130805 A 12/2013
KR 10-2017-0002504 A 1/2017
KR 10-2017-0105504 A 9/2017
KR 10-2018-0004236 A 1/2018

OTHER PUBLICATIONS

Badillo-Vargas et al., RNA interference tools for the western flower thrips, Frankliniella occidentalis. J Insect Physiol. May 2015;76:36-46. (Year: 2015).*

Balazs et al., Liposomes for use in gene delivery. J Drug Deliv. 2011;2011:326497. (Year: 2011).*

Bolognesi et al., Characterizing the Mechanism of Action of Double-Stranded RNA Activity against Western Corn Rootworm (Diabrotica virgifera virgifera LeConte), PLoS ONE 7(10): e47534. doi:10.1371/journal.pone.0047534 (Year: 2012).*

* cited by examiner

*Primary Examiner* — Robert A Wax
*Assistant Examiner* — Kimberly Barber
(74) *Attorney, Agent, or Firm* — You & IP, LLC

(57) ABSTRACT

Proposed are a composition for controlling *Frankliniella occidentalis* by oral feeding, in which a dsRNA specific to V-ATPase in *Frankliniella occidentalis* is formulated into a liposomal form and a method of controlling *Frankliniella occidentalis* using the same. The composition contains a dsRNA specific to V-ATPase in *Frankliniella occidentalis* and a carrier to formulate the dsRNA in a liposomal form, in which *Frankliniella occidentalis* is controlled by oral feeding. When orally feeding the composition to larvae and adults of *Frankliniella occidentalis*, the dsRNA is prevented from being degraded by dsRNase in the intestinal lumen of insects. Therefore, with the maintained RNAi effect, the corresponding gene expression can be effectively inhibited, thereby exhibiting excellent insecticidal effects. In addition, excellent control effects are obtainable by oral feeding, a simple method involving a process of spraying the composition onto host plants attacked by *Frankliniella occidentalis*.

4 Claims, 13 Drawing Sheets

Specification includes a Sequence Listing.

COMPOSITION TARGETING V-ATPASE FOR CONTROLLING *FRANKLINIELLA OCCIDENTALIS* AND METHOD OF CONTROLLING *FRANKLINIELLA OCCIDENTALIS* USING SAME

CROSS REFERENCE TO RELATED APPLICATION

The present application claims priority to Korean Patent Application No. 10-2022-0184272, filed Dec. 26, 2022, the entire contents of which is incorporated herein for all purposes by this reference.

REFERENCE TO AN ELECTRONIC SEQUENCE LISTING

The contents of the electronic listing (PANY-117-Sequence_Listing.xml; Size: 22, 655 bytes; and Date of Creation: Dec. 23, 2022) is herein incorporated by reference in its entirety.

STATEMENT REGARDING GOVERNMENT SPONSORED RESEARCH

This invention was made with Korean government support under "Development of technology to remove alien organisms that threaten biodiversity" awarded by Rural Development Administration of Republic of Korea.

BACKGROUND OF THE DISCLOSURE

1. Field of the Disclosure

The present disclosure relates to a composition targeting V-ATPase for controlling *Frankliniella occidentalis* and a method of controlling *Frankliniella occidentalis* using the same.

2. Description of the Related Art

*Frankliniella occidentalis*, classified as the Thripidae among the several families of the Tenebrantia suborder, is a pest that attacks all kinds of crops, such as peppers, watermelons, melons, cucumbers, lilies, carnations, chrysanthemums, gerberas, roses, tangerines, apples, peaches, and the like.

*Frankliniella occidentalis* has a broad host spectrum and causes severe economic damage to a variety of ornamental and other horticultural crops. In particular, *Frankliniella occidentalis* feeds on or lays eggs on host plants, and also serves as the vector of a phytopathogenic bacterium called tomato spotted wilt virus (TSWV), causing direct and indirect damage to crops. It is well-known in many countries that *Frankliniella occidentalis* is likely to invade and colonize new habitats. In fact, *Frankliniella occidentalis* was first discovered in 1993 and found in most areas of Korea within a decade.

*Thrips* may frequently occur in crops due to the relatively small size, elusive behavior, short generation time, and high reproductive rate thereof. Chemical insecticides are being used for controlling *thrips*, but the control efficacy is not always satisfactory due to the rapid development of insecticide resistance. Typically, plants develop a series of structural and inducible defense mechanisms against insect feeding stress. Breeding insect-resistant varieties has been considered to be effective in thrift control. However, insects also evolve defense mechanisms, including behavioral, physiological, and biochemical adaptations, to increase survival and reproduction on host plants. In fact, *Frankliniella occidentalis* induced detoxification potential by enhancing glutathione S-transferase activity for secondary metabolites, such as tannins, alkaloids, total phenols, flavonoids, and lignin.

RNA interference (RNAi) is defined as sequence-specific silencing of target gene expression by shortening the mRNA life cycle. In the RNAi pathway, target mRNA hybridizes with antisense to form double-stranded RNA (dsRNA), which is cleaved by RNase (=Dicer). RNAi has provided novel and powerful reverse genetic tools for identifying gene functions and has shown great potential in pest control. RNAi can be selectively used to kill pests without adversely affecting non-target species by targeting genes essential for the survival of specific pests.

RNAi has been used to regulate gene expression during the development of eukaryotes, including insects. A dicer or dicer-like protein, a cell enzyme, is activated in response to dsRNA, so the dsRNA is cleaved into siRNAs {small (21-24 nucleotides) interfering RNAs}. One of the siRNA strands is loaded onto an RNA-induced silencing complex (RISC). The complementary sequence is monitored, followed by monitoring the complementary sequence, and then undergoes translational arrest or is degraded by the action of Argonaute (AGO) core protein in the RISC.

Typically, dsRNA is delivered by oral administration of a diet coated with dsRNA, and dsRNA delivery methods include microinjection, feeding, and immersion. Whitten et al. (2016) successfully fed *Frankliniella occidentalis* on a medium containing dsRNA-expressing bacteria and targeted the alpha-tubulin gene, resulting in significant mortality in insects, especially those in the larval life stage.

Vacuolar-type ATPase (V-ATPase) is highly conserved in eukaryotic organisms due to the catalytic activity in which a wide array of intracellular compartments is acidified by pumping protons across plasma membranes with the help of ATP hydrolysis. Typically, V-ATPase is composed of two domains, a membrane $V_0$ domain that serves as $H^+$ channels and an external $V_1$ domain that performs ATP hydrolysis. The $V_1$ domain contains eight subunits (A to H), and three copies of the subunits A and B perform catalytic activities. V-ATPase is involved not only in luminal pH regulation but also in solute transport across plasma membranes. Baum et al. (2007) proved the control efficacy of dsRNA specific to V-ATPase against corn rootworm.

V-ATPase is well-known for mediating insect salivation. In Calliphoravicina, serotonin induces salivation by increasing CAMP levels to activate protein kinase A, thereby assembling and activating V-ATPase at apical membranes. Saliva contains various functional elements for digestion and detoxification of toxic secondary metabolites in host plants and thus plays important roles in the diet of *Frankliniella occidentalis*.

Han et al. (2019) screened the RNAi efficiency of 57 genes in *F. occidentalis*, including V-ATPase, and proposed four types of dsRNAs specific to Toll-like receptor 6 (TLR6), apolipophorin (apoLp), coatomer protein subunit epsilon (CopE), and sorting/assembly machinery (SAM).

DOCUMENT OF RELATED ART

Patent Document (Patent Document 0001) Korean Patent Application Publication No. 10-2013-0130804

(Patent Document 0002) Korean Patent Application Publication No. 10-2018-0004236

(Patent Document 0003) Korean Patent Application Publication No. 10-2017-0105504

(Patent Document 0004) Korean Patent Application Publication No. 10-2017-0002504

(Patent Document 0005) Korean Patent Application Publication No. 10-2013-0130805

SUMMARY OF THE INVENTION

The present disclosure aims to provide a method of controlling *Frankliniella occidentalis* on the basis of RNA interference (RNAi) by oral feeding of dsRNAs specific to eight subunits (V-ATPaseA to V-ATPaseH) of the $V_1$ domain of V-ATPase in *Frankliniella occidentalis*, in which each dsRNA is formulated in a liposomal form to prevent degradation during oral feeding.

In order to achieve the objective described above, the present disclosure provides a composition targeting V-ATPase for controlling *Frankliniella occidentalis*, which contains: a dsRNA specific to V-ATPase in *Frankliniella occidentalis*; and a carrier to formulate the dsRNA in a liposomal form, in which *Frankliniella occidentalis* is controlled by oral feeding.

In a preferred embodiment of the present disclosure, the carrier contains a mixture of N-[1-(2,3-dioleyloxy)propyl]-N,N,N-trimethylammonium chloride and dioleoylphosphatidylethanolamine.

In another preferred embodiment of the present disclosure, the carrier contains a mixture of a polycationic lipid and a neutral lipid.

The dsRNA specific to the V-ATPase in the composition preferably includes a dsRNA specific to at least one of subunits A and B of the $V_1$ domain of the V-ATPase. In a preferred embodiment, the subunit A-specific dsRNA is prepared using primers of SEQ ID NOs: 1 and 2 in the sequence listing, and the subunit B-specific dsRNA is prepared using primers of SEQ ID NOs: 3 and 4 in the sequence listing.

In addition, the present disclosure provides a method of controlling *Frankliniella occidentalis* by oral feeding, which includes: spraying the composition targeting the V-ATPase for controlling *Frankliniella occidentalis* onto a host plant attacked by *Frankliniella occidentalis*.

In the control method, the composition for controlling *Frankliniella occidentalis* is preferably sprayed onto the host plant at a concentration of 1,000 to 3,000 ppm.

In the method, the host plant is preferably at least oneofa red pepper, a watermelon, a melon, a cucumber, a lily, a carnation, a *chrysanthemum*, a *gerbera*, a rose, a tangerine, an apple, and a peach.

In a composition for controlling *Frankliniella occidentalis* of the present disclosure, dsRNAs specific to eight subunit genes (V-ATPaseA to V-ATPaseH) of the $V_1$ domain of V-ATPase in *Frankliniella occidentalis* is formulated in liposomal forms to prevent degradation during oral feeding. The dsRNAs are prevented from being degraded by dsRNase in the intestinal lumen of insects when fed orally to larvae and adults of *Frankliniella occidentalis*. As a result, with the maintained RNAi effect, the corresponding gene expression is effectively inhibited, and excellent insecticidal effects thus can be exhibited.

In addition, excellent control effects can be obtained on the basis of RNAi by oral feeding, a simple method involving a process of spraying the composition for controlling *Frankliniella occidentalis* of the present disclosure onto a host plant attacked by *Frankliniella occidentalis*. The control effect in fields is unlikely to exceed 50% during normal feeding. However, the composition for controlling *Frankliniella occidentalis* of the present disclosure exhibits an excellent control effect against *Frankliniella occidentalis* of more than 50%. In particular, the dsRNA specific to V-ATPaseA or V-ATPaseB exhibits a control effect of 80% or more in both larvae and adults. This effect is equivalent to or better than that in the RNAi of Toll-like receptor 6 (TLR6), known to have excellent control efficacy against larvae and adults of *Frankliniella occidentalis*.

In addition, the control method of the present disclosure targets *Frankliniella occidentalis*, thereby affecting non-target insects at a minimum level and being relatively safe for other non-target insects. As a result, the control method can be effectively used to control *Frankliniella occidentalis* in fields.

DESCRIPTION OF THE PREFERRED EMBODIMENTS

Figure 1:
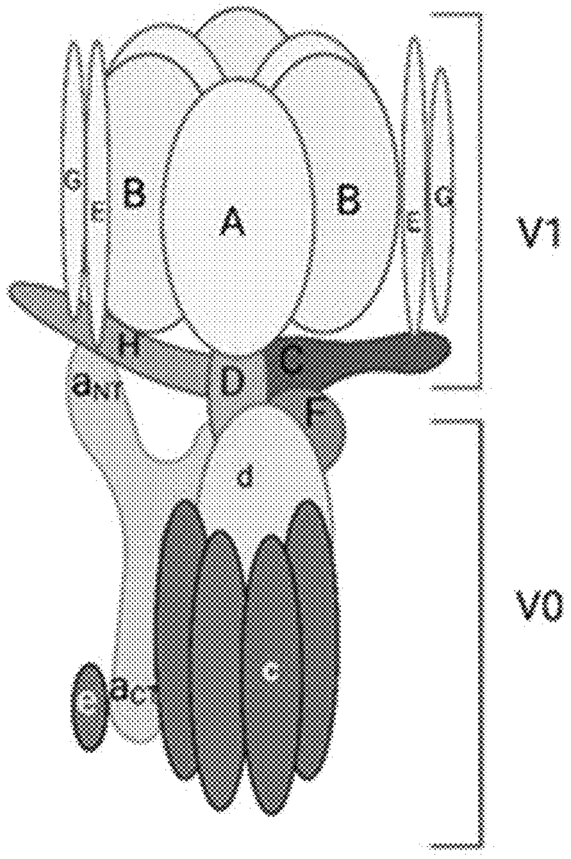
FIG. 1 illustrates a molecular structure of V-ATPase domains (subunits) in the genome of *Frankliniella occidentalis;*

The present disclosure relates to a composition targeting V-ATPase for controlling *Frankliniella occidentalis*, in which a dsRNA specific to V-ATPase in *Frankliniella occidentalis* is formulated in a liposomal form to control *Frankliniella occidentalis* by oral feeding.

In addition, the present disclosure relates to a method of controlling *Frankliniella occidentalis*, in which *Frankliniella occidentalis* is controlled by oral feeding of the composition targeting the V-ATPase for controlling *Frankliniella occidentalis* sprayed onto a host plant attacked by *Frankliniella occidentalis*.

Hereinafter, the present disclosure will be described in detail.

The composition targeting the V-ATPase for controlling *Frankliniella occidentalis* of the present disclosure contains: a dsRNA specific to V-ATPase in *Frankliniella occidentalis*; and a carrier to formulate the dsRNA in a liposomal form, in which *Frankliniella occidentalis* is controlled by oral feeding.

The $V_1$ domain of the V-ATPase in *Frankliniella occidentalis* contains eight subunits (A to H). Each dsRNA specific to the eight subunits (A to H) of the V-ATPase $V_1$ domain may be prepared as follows.

First, complementary DNAs (cDNAs) are synthesized from RNAs for use as a template DNA. The template DNA is subjected to PCR amplification using DNA Taq polymerase and gene-specific forward and reverse primers. The template DNA is preferably amplified using a gene-specific primer containing a T7 promoter sequence at the 5' end. The sequences of primers linked to the T7 promoter, used to synthesize the dsRNA for each V-ATPase subunit (A to H), are represented by SEQ ID Nos: 1 to 16 in the sequence listing.

SEQ ID NOs: 1 and 2 represent forward and reverse primers for V-ATPase subunit A, SEQ ID NOs: 3 and 4 represent forward and reverse primers for V-ATPase subunit B, SEQ ID NOs: 5 and 6 represent forward and reverse primers for V-ATPase subunit C, SEQ ID NOs: 7 and 8 represent forward and reverse primers for V-ATPase subunit D, SEQ ID NOs: 9 and 10 represent forward and reverse primers for V-ATPase subunit E, SEQ ID NOs: 11 and 12 represent forward and reverse primers for V-ATPase subunit F, SEQ ID NOs: 13 and 14 represent forward and reverse primers for V-ATPase subunit G, and SEQ ID NOs: 15 and 16 represent forward and reverse primers for V-ATPase subunit H.

PCR amplification is preferably performed by the following process: initial heat treatment at a temperature of 94° C. for 5 minutes, denaturation at a temperature of 94° C. for 1 minute, annealing at various temperatures (in a range of 52° C. to 55° C.) for 1 minute, and 35 cycles of extension at a temperature of 72° C. for 1 minute. The PCR reaction is completed with final chain extension at a temperature of 72° C. for 10 minutes.

Through the above processes, dsATPaseA to dsATPaseH, dsRNAs specific to the respective sub units of the V-ATPase, are obtained.

The dsRNAs (dsATPaseA to dsATPaseH) specific to the respective subunits of the V-ATPase, the primers used to prepare the dsRNAs specific to the respective genes used in the experiment, the annealing temperatures, and the expected size (bp) of the obtained nucleic acid are shown in Table 1 below.

TABLE 1

| vATPase subunit | Sequence (5'-3') | Uses | Annealing temp (° C.) | Expected size (bp) |
|---|---|---|---|---|
| A | TGACGGTATCCAACGTCCAC<br>TTTGACCAGTCAGCAGTGGG | RT-PCR<br>RT-qPCR | 52.0 | 395 |
| T7+A | TAATACGACTCACTATAGGGAGATGACGGTATCCAACGTCCAC<br>TAATACGACTCACTATAGGGAGATTTGACCAGTCAGCAGTGGG | RNAi | 52.0 | 441 |
| B | CTCGCGAACATGTTTTGGCT<br>GAGCCGTTGAAAACACGACC | RT-PCR<br>RT-qPCR | 52.0 | 322 |
| T7+B | TAATACGACTCACTATAGGGAGACTCGCGAACATGTTTTGGCT<br>TAATACGACTCACTATAGGGAGAGAGCCGTTGAAAACACGACC | RNAi | 52.0 | 368 |
| C | GAACTTGGCAGACCTCGTGA<br>AGTTGACAGGCAGGCCATAC | RT-PCR<br>RT-Qpcr | 52.0 | 455 |
| T7+C | TAATACGACTCACTATAGGGAGAGAACTTGGCAGACCTCGTGA<br>TAATACGACTCACTATAGGGAGAAGTTGACAGGCAGGCCATAC | RNAi | 52.0 | 501 |
| D | GAAGCCGCTTTCTCTCTTGC<br>TGACAGCTGCCTGGTAGTTC | RT-PCR<br>RT-qPCR | 52.0 | 238 |
| T7+D | TAATACGACTCACTATAGGGAGAGAAGCCGCTTTCTCTCTTGC<br>TAATACGACTCACTATAGGGAGATGACAGCTGCCTGGTAGTTC | RNAi | 52.0 | 284 |
| E | AGTCCAACAGCAACGTCTGA<br>CTCCCAAACGTCTCCTTGCT | RT-PCR<br>RT-qPCR | 55.0 | 176 |
| T7+E | TAATACGACTCACTATAGGGAGAAGTCCAACAGCAACGTCTGA<br>TAATACGACTCACTATAGGGAGACTCCCAAACGTCTCCTTGCT | RNAi | 55.0 | 222 |

TABLE 1-continued

| vATPase subunit | Sequence (5'-3') | Uses | Annealing temp (° C.) | Expected size (bp) |
|---|---|---|---|---|
| F | ACCGCCAACCCAATTTTATGC<br>GGTTGAACATGCCCTTCGC | RT-PCR<br>RT-qPCR | 55.0 | 252 |
| T7+F | TAATACGACTCACTATAGGGAGAACC<br>GCCAACCCAATTTTATGG<br>TAATACGACTCACTATAGGGAGAGGT<br>TGAACATGCCCTTCGC | RNAi | 55.0 | 298 |
| G | CGTTTGAAGCAGGCAAAGGA<br>TGGTGTCAGCTTCAATGCGA | RT-PCR<br>RT-qPCR | 55.0 | 139 |
| T7+G | TAATACGACTCACTATAGGGAGACGT<br>TTGAAGCAGGCAAAGGA<br>TAATACGACTCACTATAGGGAGATGG<br>TGTCAGCTTCAATGCGA | RNAi | 55.0 | 185 |
| H | GAACGAACGTTTGCAGGCTT<br>CTCCCTCCAGAATTGAGCCG | RT-PCR<br>RT-qPCR | 55.0 | 121 |
| T7+H | TAATACGACTCACTATAGGGAGAGAA<br>CGAACGTTTGCAGGCTT<br>TAATACGACTCACTATAGGGAGACTC<br>CCTCCAGAATTGAGCCG | RNAi | 55.0 | 167 |
| Elongation | TCAAGGAACTGCGTCGTGGAT | | 52.0 | 160 |
| Factor 1 | ACAGGGGTGTAGCCGTTAGAG | RT-qPCR | | |
| TLR 6 | CCGCCTCACTGACATATCTG<br>TGCGGTTCTGGTGCATGTCG | RT-PCR<br>RT-Qpcr | 55.0 | 140 |
| T7+TLR6 | TAATACGACTCACTATAGGGAGA<br>CCGCCTCACTGACATATCTG<br>TAATACGACTCACTATAGGGAGA<br>TGCGGTTCTGGTGCATGTCG | RNAi | 55.0 | 186 |

The dsATPaseA to dsATPaseH exhibit insecticidal effects against *Frankliniella occidentalis* on the basis of RNA interference (RNAi). Among dsATPaseA to dsATPaseH, the insecticidal activities of dsATPaseA and dsATPaseB are the best.

The dsRNA specific to the V-ATPase exhibits a control effect equivalent to or better than that of the dsRNA specific to Toll-like receptor 6 (TLR6), which is known to have excellent control effects against *Frankliniella occidentalis.*

The composition for controlling *Frankliniella occidentalis* of the present disclosure contains the carrier to formulate the dsRNA prepared as described above in a liposomal form, in which the carrier formulates the dsRNA in the liposomal form to prevent degradation during oral feeding. With the formulation in the liposomal form, the dsRNA may be protected from dsRNase that degrades dsRNA. As a result, the dsRNA is prevented from being degraded in the intestinal lumen of insects, and the RNAi effect thus is maintained.

Liposomes are composed of phospholipids, the main components of biological membranes, with a hydrophilic head part and a hydrophobic tail part. Here, the tails come into contact to form a bilayer lipid membrane, and a vesicle with a hydrophilic cavity is formed on the inside, so substances to be carried may be contained. Liposomes may be prepared by applying ultrasonic waves to a solution mixed with phospholipids or allowing a filter to pass through with mechanical force.

In a preferred embodiment of the present disclosure, the carrier contains a mixture of an artificial lipid, N-[1-(2,3-dioleyloxy)propyl]-N,N,N-trimethylammonium chloride, and a phospholipid, dioleoylphosphatidylethanolamine. In particular, lipofectin may be contained. Such prepared liposomes may form complexes with DNA or RNA and fuse with cell membranes to smoothly introduce nucleic acids into cells.

In another preferred embodiment of the present disclosure, the carrier contains a mixture of a polycationic lipid and a neutral lipid. In particular, Metafectene™ may be contained. Metafectene™ may reach efficient levels in DNA transfection of most mammalian cells and has low cytotoxicity. In addition, Metafectene™ is suitable for the transfection of DNA (plasmids and bacmids), RNA (mRNA, miRNA, and siRNA), and modified nucleic acids (antisense oligonucleotides).

As described above, the control effect against *Frankliniella occidentalis* may be improved by formulating the dsRNA in the liposomal form. When formulating the dsRNA in the liposomal form, the insecticidal activity of the dsRNA specific to the V-ATPase significantly increased in both larvae and adults of *Frankliniella occidentalis.*

A method of controlling *Frankliniella occidentalis* of the present disclosure includes controlling *Frankliniella occidentalis* by oral feeding of the composition targeting the V-ATPase for controlling *Frankliniella occidentalis*, prepared as described above, sprayed onto a host plant attacked by *Frankliniella occidentalis.*

Any host plants are applicable without limitation, and all crops capable of being attacked by *Frankliniella occidentalis*, such as peppers, watermelons, melons, cucumbers, lilies, carnations, chrysanthemums, gerberas, roses, tangerines, apples, peaches, and the like, are preferably included.

The formulation for controlling *Frankliniella occidentalis* is preferably sprayed onto the host plant at a concentration of 1,000 to 3,000 ppm and more preferably sprayed at a concentration of 1,500 to 2,500 ppm.

When spraying the composition containing the dsRNA as described above, both the host plant and the composition containing the dsRNA are fed orally to *Frankliniella occidentalis*, thereby exhibiting insecticidal effects against *Frankliniella occidentalis* on the basis of RNAi activity.

The control effect in fields is unlikely to exceed 50% when normally fed. However, the composition for controlling *Frankliniella occidentalis* of the present disclosure exhibits an excellent control effect against *Frankliniella occidentalis* of more than 50%. In particular, the dsRNA specific to V-ATPaseA or to V-ATPaseB exhibits a control effect of 80% or more in both larvae and adults.

The formulation for controlling *Frankliniella occidentalis* of the present disclosure is the dsRNA specific to the V-ATPase in *Frankliniella occidentalis* and thus is advantageous in that non-target insects are safe by targeting only the V-ATPase in *Frankliniella occidentalis.*

Hereinafter, the present disclosure will be described in more detail through the following embodiments. These embodiments are disclosed only for illustrative purposes, and the scope of the present disclosure is not limited thereto.

Example 1

Preparation of dsRNAs Specific to V-ATPase Subunits

First, dsRNAs specific to eight subunits (A to H) of the V-ATPase $V_1$ domain in *Frankliniella occidentalis* were prepared as follows.

Template DNA amplification was performed using primers specific to the respective genes. The primers used for the template DNA amplification of the respective eight subunits (A to H) of the V-ATPase $V_1$ domain are shown in Table 1 above.

In vitro transcription was performed using a MEGA script RNAi kit (Ambion, Austin, TX, USA) according to the manufacturer's instructions. In this case, the dsRNA was prepared using a primer containing a T7 promoter linked to the 5' end. The primers used to prepare the dsRNA for the respective eight subunits (A to H) of the V-ATPase $V_1$ domain are shown in Table 1 above.

The resulting dsRNAs were each independently mixed with Metafectene PRO™ (Biontex, Plannegg, Germany), a transfection reagent, in a volume ratio of 1:1 and then incubated at temperature for 30 minutes to form liposomes.

RNAi efficiency was measured from 0 to 24 hours by RT-qPCR. For in situ analysis, the two types of dsRNAs specific to V-ATPaseA and V-ATPaseB were produced in a large scale by Genolution Inc. (Seoul, Korea).

During the production process, dsRNAs with three quality gradeswere produced: "Grade 1" as an unpurified dsRNA mixture, "Grade 2" as a dsRNA product purified by alcohol precipitation, and "Grade 3" as a dsRNA product purified by filtration.

Comparative Example 1

Preparation of dsRNA Specific to TLR6

A dsRNA specific to TLR6 in *Frankliniella occidentalis* was prepared in the same manner as in Example 1, except for using a primer for TLR6 in Table 1 as the primer.

Comparative Example 2

Preparation of dsRNA specific to elongation factor 1 (EF1)

A dsRNA specific to EF1 in *Frankliniella occidentalis* was prepared in the same manner as in Example 1, except for using a primer for EF1 in Table 1 as the primer, and then used as a reference gene.

EXPERIMENTAL EXAMPLE

Insect Breeding

Larvae and adults of *Frankliniella occidentalis* were collected from the National Institute of Agricultural Science (Jeonju). Breeding conditions were maintained as follows: a temperature in a range of 25±2° C., a photoperiod of 14:10 h (L:D), and a relative humidity in a range of 65±5%. The *thrips* were bred while continuously feeding soybeans (*Phaseolus coccineus*) using a circular breeding container (100×40 mm, SPL, Seoul, Korea). The soybeans were germinated, and then the germinated soybeans were fed to the larvae and adults as food.

Bioinformatics

Eight subunit sequences of the V-ATPase $V_1$ domain (A to H) in *Frankliniella occidentalis* were obtained with GenBank accession numbers: XM_026418961.1, KP234253.1, XM_026421419.1, XM_026424871.1, XM_026438253.1, XM_026421632.1, XM_026416289.1, and XM_026438737.1. The obtained sequences were subjected to open reading frame (ORF) analysis using ORF finder.

RNA Extraction, cDNA Synthesis, RT-PCR, and RT-qPCR

RNA samples with approximately 50 individuals in each stage were extracted from all developmental stages using a TRIzol reagent (Invitrogen, Carlsbad, CA, USA) according to the manufacturer's instructions. The RNA samples were resuspended in nuclease-free water, and then a spectrophotometer (NanoDrop, Thermo Scientific, Wilmington, DE, USA) was used to measure the RNA concentration. The extracted RNA (60 ng per reaction) was used for cDNA synthesis using RT-Premix (Intron Biotechnology, Seoul, Korea) containing oligo-DT primers according to the manufacturer's instructions.

The synthesized cDNA was used for PCR amplification using DNA Taq polymerase (GeneALL, Seoul, Korea) and gene-specific forward and reverse primers under the following conditions: initial heat treatment at a temperature of 94° C. for 5 minutes, denaturation at a temperature of 94° C. for 1 minute, annealing at various temperatures (in a range of 52° C. to 55° C.), and 35 cycles of extension at a temperature of 72° C. for 1 minute. The PCR reaction was completed with final chain extension at a temperature of 72° C. for 10 minutes. Each PCR reaction mixture (25 μl) was composed of the DNA template, dNTPs (2.5 mM each), 10 pmol of each of the forward and reverse primers, and Taq polymerase (2.5 units/μl):

Quantitative PCR (qPCR) was performed using a real-time PCR machine (StepOnePlus Real-Time PCR System, Applied Biosystems, Singapore) with Power SYBR Green PCR Master Mix (Life Technologies, Carlsbad, CA, USA) according to the guideline of Bustin et al. (2009). Each reaction mixture (20 μl) was composed of 10 μl of Power SYBR Green PCR Mix, 2 μl of the cDNA template (60 ng/μl), and 1 μl of each of the forward and reverse primers. Elongation factor 1 (EF1) was used as the reference gene. The quality of each PCR end-product was evaluated by melting curve analysis. Quantitative analysis was performed using the comparative CT ($2^{-\Delta\Delta CT}$) method (Livak and Schmittgen, 2001). Each experiment was repeatedly performed three times by preparing each sample.

Statistical Analysis

All studies were performed by one-way ANOVA using PROC GLM of the SAS program (SAS Institute, 1989). Mortality data were subjected to arcsine transformation and then used for ANOVA. Mean values were compared with the results obtained from least squared difference (LSD) tests. Three biologically independent experiments were repeatedly performed, and the results thereof were expressed as mean±standard error value using SigmaPlot. As for the schematic diagram, the Biorender program was used.

Experimental Example 1

Expression profiles of eight subunit genes of V-ATPase in *Frankliniella occidentalis*

The expression profiles of the eight subunit genes of the V-ATPase in *Frankliniella occidentalis* were confirmed as follows.

Figure 2:
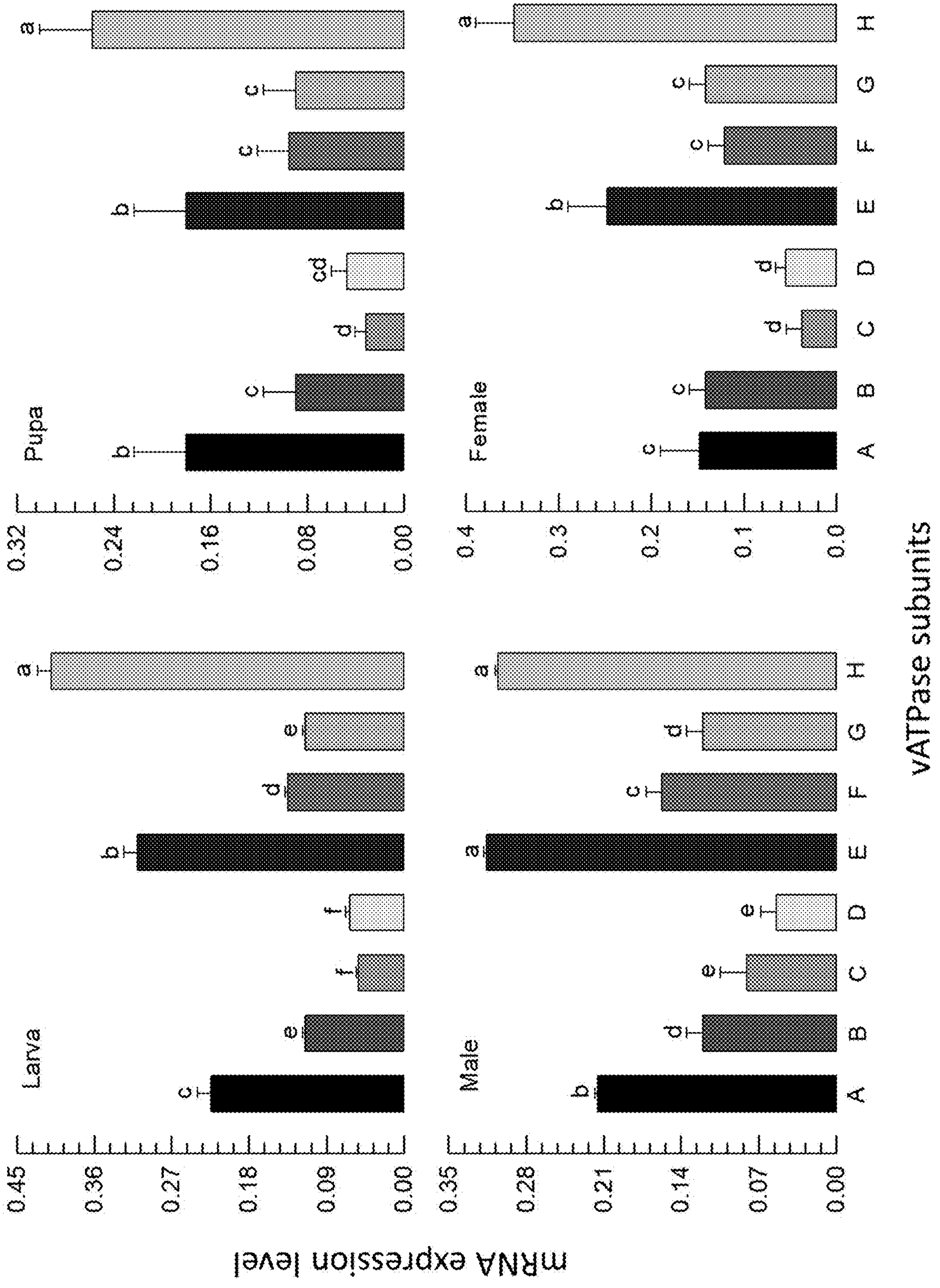
FIG. 2 shows results confirming the expression level of eight subunits of the V-ATPase $V_1$ domain in each stage of *Frankliniella occidentalis;*

The identification and expression patterns of the V-ATPase domain (subunits) in the genome of *Frankliniella occidentalis* are shown in FIGS. 1 and 2.

First, the molecular structure of the V-ATPase domain (subunits) is shown in FIG. 1. The V-ATPase domain is divided into $V_0$ and $V_1$, where the $V_0$ domain contains five subunits, a to e, and the $V_1$ domain contains eight subunits, A to H.

The eight subunits (A to H) were obtained from the V-ATPase $V_1$ domain in the genome of *Frankliniella occidentalis*. Expression levels, of the eight subunits of the V-ATPase $V_1$ domain were analyzed in each developmental stage of *Frankliniella occidentalis*. The expression levels in various developmental stages were normalized using EF1. Each experiment was repeatedly performed three times.

The analysis results thereof are shown in FIG. 2. In the graph of FIG. 2, different letters above the standard deviation bars indicate that there are significant differences between the mean values at a type I error of 0.05 (LSD test).

As shown in the results of FIG. 2, all eight subunit genes were expressed in the larval, pupal, and adult stages. However, the expression levels of different subunits differed in each developmental stage. However, the expression of V-ATPaseE and V-ATPaseH were relatively high in each stage, which showed similar expression: patterns in differing stages.

Experimental Example 2

Sequence Homologies Between Other Insect Orthologs with Eight Subunits of V-ATPase of *Frankliniella occidentalis*

Sequence homologies between other insect orthologs with the eight subunits of the V-ATPase in *Frankliniella occidentalis* were confirmed using the NCBI Blast search engine. The results thereof are shown in Tables 2 to 9 below.

TABLE 2

| | | V-ATPaseA of *Frankliniella occidentalis* | | |
|---|---|---|---|---|
| Species | Gene | Homology score | Identity (%) | E-value |
| *Thrips palmi* | V-type proton ATPase subunit-A | 1243 | 98.04 | 0.0 |
| *Nilaparvatalugens* | V-type proton ATPase subunit-A | 1183 | 91.65 | 0.0 |
| *Vespa mandarinia* | V-type proton ATPase subunit-A | 1183 | 92.64 | 0.0 |

TABLE 3

| | | V-ATPaseB of *Frankliniella occidentalis* | | |
|---|---|---|---|---|
| Species | Gene | Homology score | Identity (%) | E-value |
| *Thrips palmi* | V-type proton ATPase subunit-B | 1018 | 99.19 | 0.0 |
| *Drosophila Byarmipes* | V-type proton ATPase subunit-B | 993 | 96.55 | 0.0 |
| *Trichoplusiani* | V-type proton ATPase subunit-B | 990 | 95.94 | 0.0 |

TABLE 4

| | | V-ATPaseC of *Frankliniella occidentalis* | | |
|---|---|---|---|---|
| Species | Gene | Homology score | Identity (%) | E-value |
| *Thrips palmi* | V-type proton ATPase subunit-C | 759 | 92.50 | 0.0 |
| *Nilaparvatalugens* | V-type proton ATPase subunit-C | 689 | 86.46 | 0.0 |
| *Triboliummadens* | V-type proton ATPase subunit-C | 687 | 85.64 | 0.0 |

TABLE 5

| | | V-ATPaseD of *Frankliniella occidentalis* | | |
|---|---|---|---|---|
| Species | Gene | Homology score | Identity (%) | E-value |
| *Homalodisca vitripennis* | V-type proton ATPase subunit-D | 420 | 90.20 | 6e−147 |
| *Nilaparvatalugens* | V-type proton ATPase subunit-D | 410 | 88.26 | 4e−143 |
| *Aphis gossypii* | V-type proton ATPase subunit-D | 409 | 86.94 | 1e−142 |

TABLE 6

| | | V-ATPaseE of *Frankliniella occidentalis* | | |
|---|---|---|---|---|
| Species | Gene | Homology score | Identity (%) | E-value |
| *Thrips palmi* | V-type proton ATPase subunit-E | 352 | 88.05 | 1e−120 |
| *Belonocne-makinseyi* | V-type proton ATPase subunit-E | 292 | 76.99 | 5e−97 |
| *Nilaparvata-lugens* | V-type proton ATPase subunit-E | 280 | 73.01 | 6e−92 |

TABLE 7

| | | V-ATPaseF of *Frankliniella occidentalis* | | |
|---|---|---|---|---|
| Species | Gene | Homology score | Identity (%) | E-value |
| *Thrips palmi* | V-type proton ATPase subunit-F | 243 | 96.67 | 6e−81 |
| *Bemisiatabaci* | V-type proton ATPase subunit-F | 231 | 89.34 | 3e−76 |
| *Apis florea* | V-type proton ATPase subunit-F | 229 | 86.07 | 2e−75 |

TABLE 8

| | | V-ATPaseG of *Frankliniella occidentalis* | | |
|---|---|---|---|---|
| Species | Gene | Homology score | Identity (%) | E-value |
| *Thrips palmi* | V-type proton ATPase subunit-G | 154 | 98.26 | 9e−46 |
| *Apis florea* | V-type proton ATPase subunit-G | 124 | 81.74 | 8e−34 |
| *Triboliummadens* | V-type proton ATPase subunit-G | 122 | 80.87 | 4e−33 |

TABLE 9

| | | V-ATPaseH of *Frankliniella occidentalis* | | |
|---|---|---|---|---|
| Species | Gene | Homology score | Identity (%) | E-value |
| *Thrips palmi* | V-type proton ATPase subunit-H | 953 | 94.87 | 0.0 |
| *Aphidiusgifuensis* | V-type proton ATPase subunit-H | 778 | 77.59 | 0.0 |
| *Coccinella-septempunctata* | V-type proton ATPase subunit-H | 774 | 77.15 | 0.0 |

As shown in the results of Tables 2 to 9, the V-ATPase genes in *Frankliniella occidentalis* exhibited an extremely high homology of 73% to 99% between the other insect orthologs in the predicted amino acid sequence.

Experimental Example 3

Insecticidal Efficacy Experiment of dsRNAs Against *Frankliniella occidentalis* in Laboratory The RNAi and subsequent insecticidal activity of each of the eight different V-ATPase subunits were confirmed as follows.

For bioassays in a laboratory, the dsRNAs (dsATPaseA to dsATPaseH) specific to the eight V-ATPase subunits were prepared using a MEGA script kit.

First, the RNAi efficiency of the dsRNA with respect to the eight subunits of the V-ATPase $V_1$ domain in *Frankliniella occidentalis* adults was confirmed as follows.

The RNAi specific to each V-ATPase subunit was performed by supplying feed soaked in a dsRNA suspension at a concentration of 500 ppm, and these dsRNAs were fed to the adults with a soybean diet. The soybeans were soaked in the dsRNA suspension at a concentration of 500 ppm for 20 minutes, followed by removing the excess moisture. Then, the treated placed in a circular breeding container (100×40 mm) (=experimental unit) and fed to ten *Frankliniella occidentalis*. After feeding the dsRNA-treated soybean diet for 12 hours, the expression level of each subunit was monitored for 24 hours by RT-qPCR. Each experiment was repeatedly performed three times. CpBV302, the viral gene, was used as a control group (Park and Kim, 2010). The expression levels were normalized using EF1.

Figure 3:
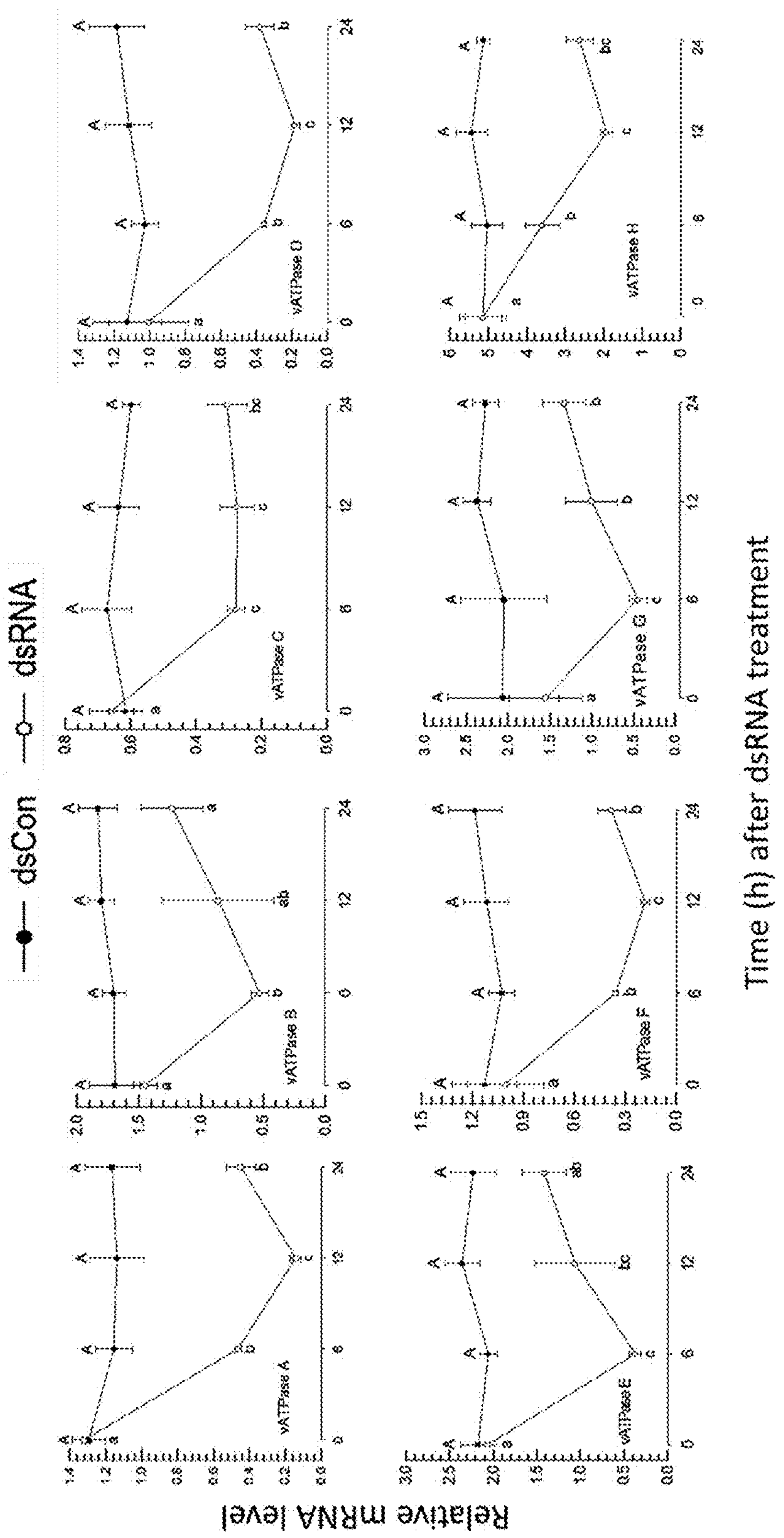
FIG. 3 shows results confirming the RNA interference (RNAi) efficiency of dsRNAs with respect to eight subunits of the V-ATPase $V_1$ domain in *Frankliniella occidentalis* adults.

The RNAi efficiency of the dsRNAs with respect to the eight subunits of the V-ATPase $V_1$ domain in the *Frankliniella occidentalis* adults is shown in FIG. 3.

As shown in FIG. 3, all RNAi processes reduced the expression levels of the targeted V-ATPase subunits by 50% or more. Except for V-ATPaseG, the expression levels of most of the V-ATPase subunits decreased the most 12 hours after feeding the dsRNAs.

The RNAi efficiency of the dsRNAs with respect to the eight subunits of the V-ATPase $V_1$ domain n larvae and adults of *Frankliniella occidentalis* was confirmed as follows.

Ten larvae and ten adults of *Frankliniella occidentalis* were used. After feeding the dsRNA-treated soybeans for 24 hours, fresh soybeans not involving treatment were supplied to the experimental *Frankliniella occidentalis*. Then, the mortality was confirmed at 7 DAT. The experiment was repeatedly performed three times.

Figure 4:
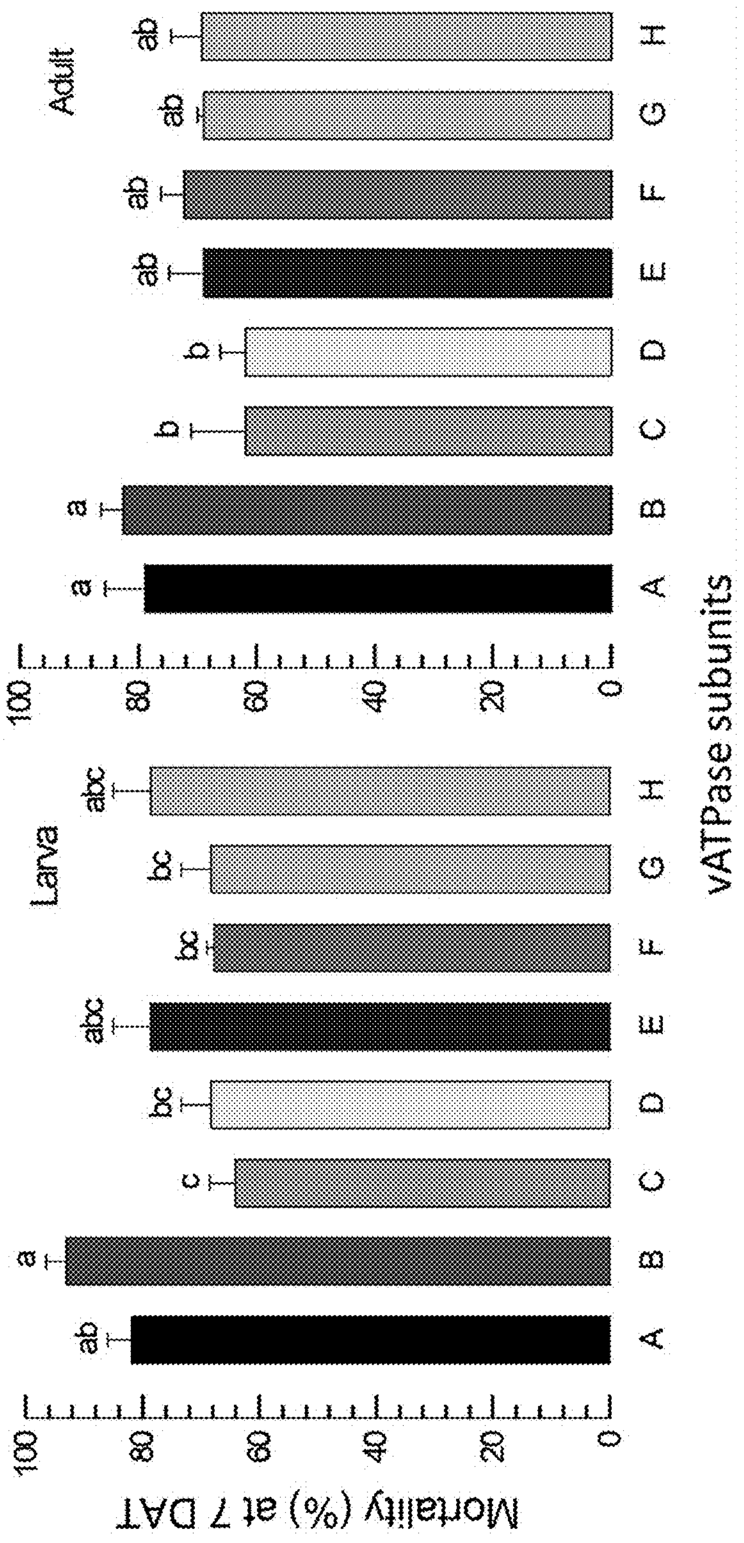
FIG. 4 shows results confirming the RNAi efficiency of dsRNAs with respect to eight subunits of the V-ATPase $V_1$ domain in larvae and adults of *Frankliniella occidentalis;*

The results confirming the RNAi efficiency of the dsRNAs with respect to the eight subunits of the V-ATPase $V_1$ domain in the larvae and adults of *Frankliniella occidentalis* are shown in FIG. 4. Different letters above the standard deviation bars indicate that there are significant differences between the mean values at a type I error of 0.05 (LSD test).

As shown in the results of FIG. 4, *Frankliniella occidentalis* treated with the dsRNAs under the RNAi conditions exhibited serious mortality ($P<0.05$). In particular, it was confirmed that when treated with the dsRNA specific to V-ATPaseA or V-ATPaseB, both the larvae and adults exhibited a mortality of 80% or more.

Experimental Example 4

Control effect of dsRNA against *Frankliniella occidentalis* in situ

For in situ analysis, three grades of the respective V-ATPase A-specific dsRNA (dsATPaseA) and V-ATPase B-specific dsRNA (dsATPaseB) were produced on a large scale.

The insecticidal activities of the three grades of dsRNAs that differ in purity, Grade 1, Grade 2, and Grade 3, against larvae and adults of *Frankliniella occidentalis* were compared as follows for analysis.

All Grade 1, Grade 2, and Grade 3 dsRNAs were prepared at a concentration of 500 ppm in the activity gradient and then applied to *Frankliniella occidentalis*. Three larvae and three adults of *Frankliniella occidentalis* were used. Then, the mortality was confirmed at 7 DAT. The results thereof are shown in FIG. 5.

Figure 5:
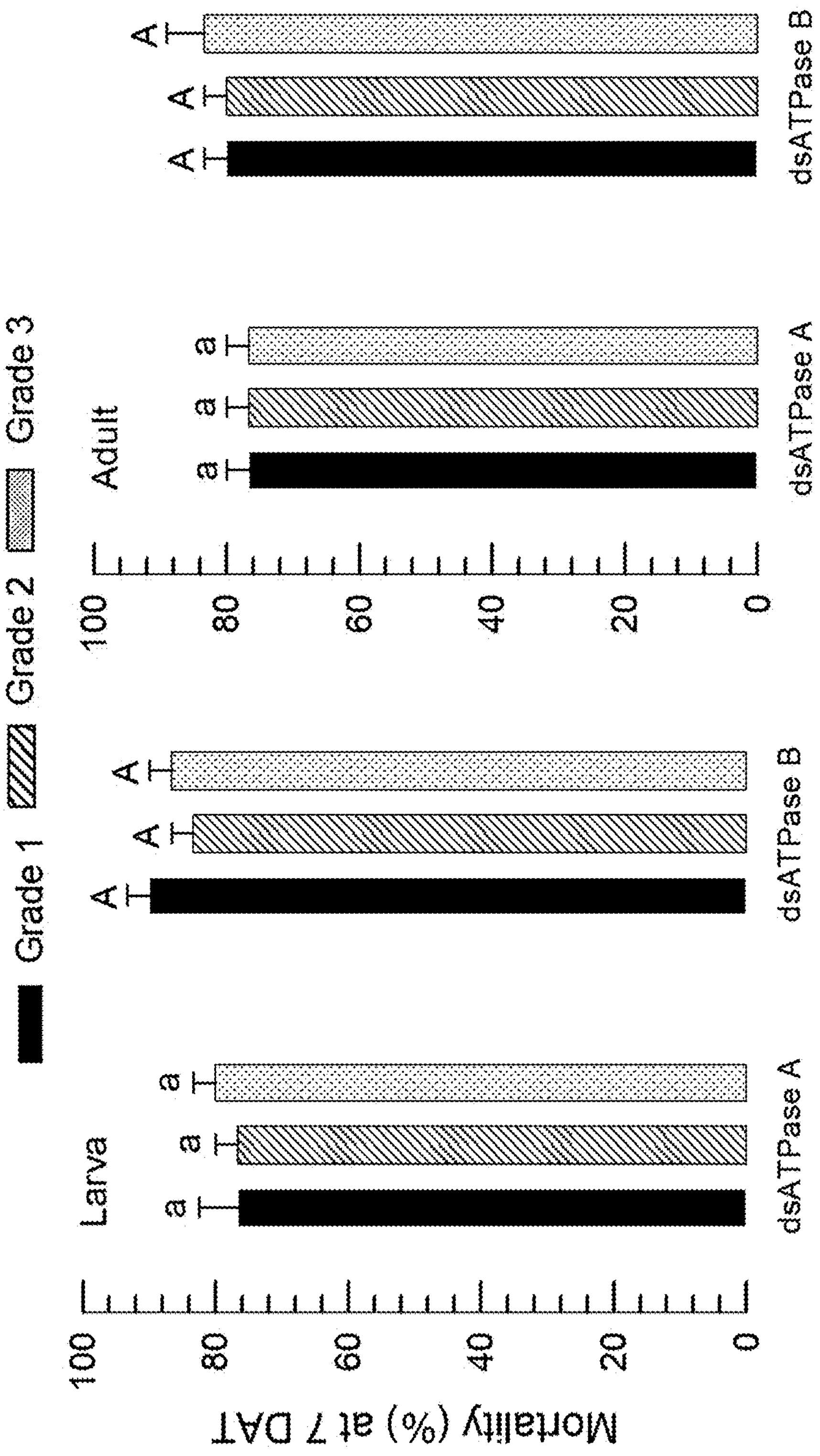
FIG. 5 shows results confirming the insecticidal activity of Grade 1, Grade 2, and Grade 3 dsRNAs against *Frankliniella occidentalis;*

As shown in the results of FIG. 5, these dsRNAs showed high control effects against the larvae and adults of *Frankliniella occidentalis*. In addition, it is confirmed that the Grade 1, Grade 2, and Grade 3 dsRNAs differ in control effects.

In addition, the mortality depending on the dose of the Grade 1 dsRNA (dsATPaseA and dsATPaseB) in the adult *Frankliniella occidentalis* was confirmed as follows.

The *Frankliniella occidentalis* adults were treated with the Grade 1 dsRNA (dsATPaseA and dsATPaseB) at each concentration of 12.4 μg/ml, 51.1 μg/ml, 103.4 μg/ml, 498.2 μg/ml, 1025 μg/ml, 1994.2 μg/ml, and 3910.1 μg/ml. In each experiment, ten *Frankliniella occidentalis* adults were used. In addition, the experiment was repeatedly performed three times.

Figure 6:
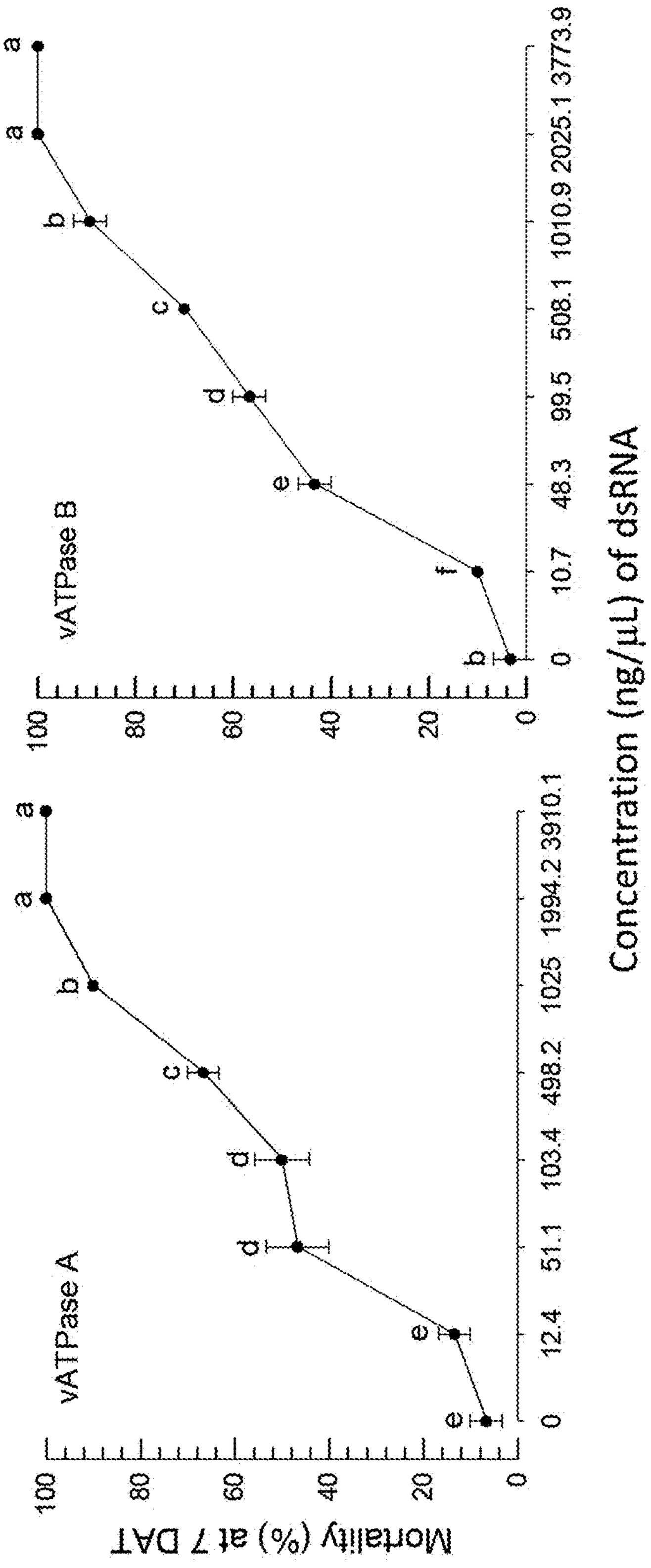
FIG. 6 shows results confirming the mortality depending on the dose of Grade 1 dsRNA (dsATPaseA and dsATPaseB) in *Frankliniella occidentalis* adults.

FIG. 6 shows the results confirming the mortality depending on the dose of dsRNA in the *Frankliniella occidentalis* adults. Different: letters above the standard deviation bars indicate that there are significant differences between the mean values at a type I error of 0.05 (LSD test) in each developmental stage or target gene.

As shown in the results of FIG. 6, with the increasing amounts of the dsRNAs, the mortality of *Frankliniella occidentalis* increased. In addition, both types of dsRNAs specific to V-ATPaseA and V-ATPaseB showed a mortality of 100% at a concentration of about 2,000 ppm.

In addition, the lethal concentration 50 ($LC_{50}$) of the V-ATPase A-specific dsRNA and the V-ATPase B-specific dsRNA was compared. The results thereof are shown in Table 10 below.

TABLE 10

| dsRNA | Stage | N | $LC_{50}$ (ppm) | Slope ± SE | $X^2$ | df | $R^2$ |
|---|---|---|---|---|---|---|---|
| dsATPaseA | Adult | 3 | 144.156 (67.424 to 308.213) | 1.183 ± 0.168 | 0.951 | 5 | 0.972 |
| dsATPaseB | Adult | 3 | 102.824 (49.600 to 213.163) | 1.307 ± 0.162 | 0.987 | 5 | 0.983 |

As shown in the results of Table 10, it was confirmed that the V-ATPase B-specific dsRNA had a better effect than the V-ATPase A-specific dsRNA.

Experimental Example 5

Insecticidal activities of dsRNAs specific to V-ATPaseA, V-ATPaseB, and TLR6 (dsATPaseA, dsATPaseB, and dsTLR6) against *Frankliniella occidentalis*

Earlier screening suggested TLR6 among 57 gene-specific dsRNAs as a potent target for effective control of *Frankliniella occidentalis*.

Figure 7:
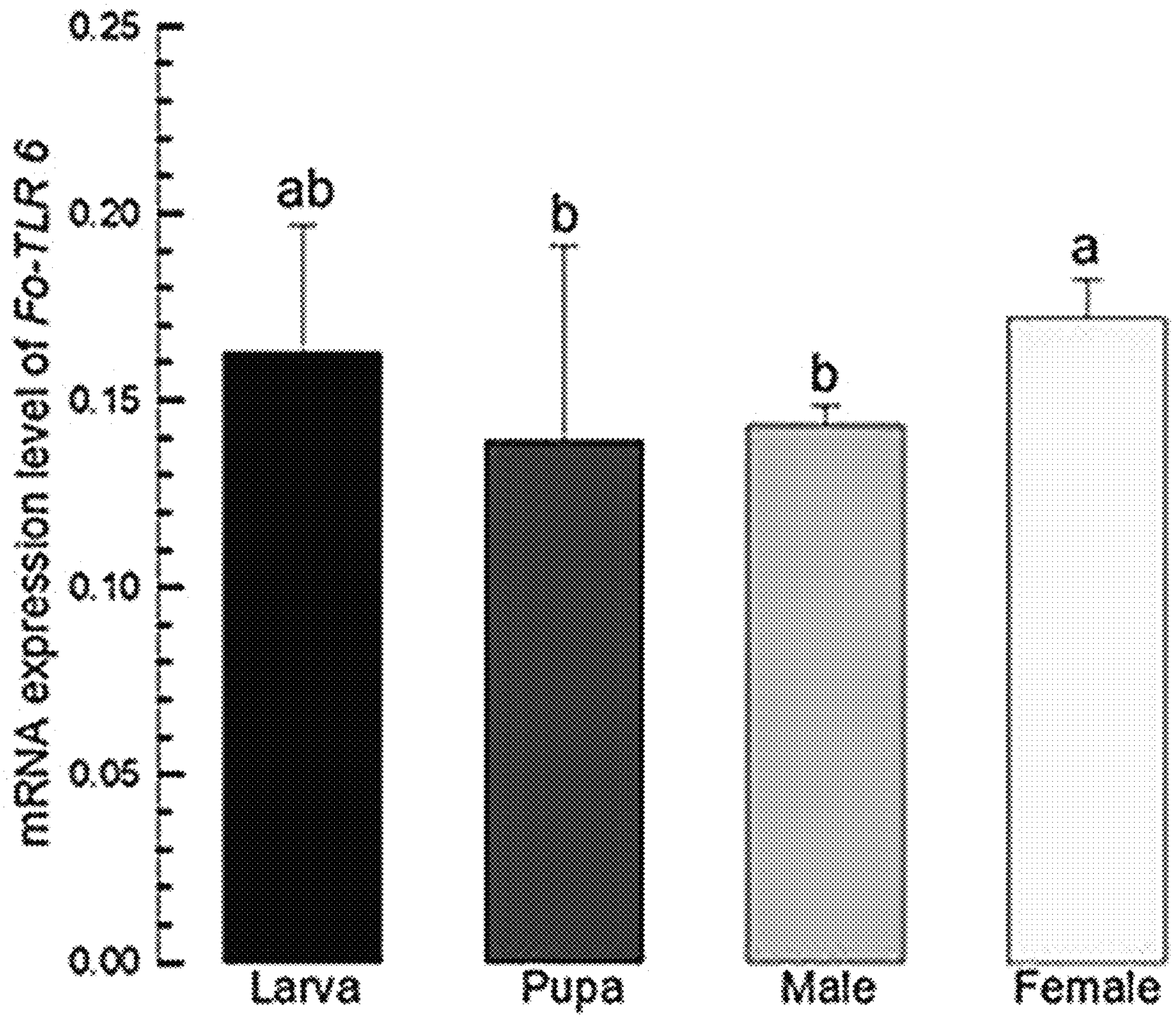
FIG. 7 shows analysis results of expression of Toll-like receptor 6 (TLR6) in various developmental stages of *Frankliniella occidentalis;*

First, Toll-like receptor 6 (TLR6) expression was analyzed in various developmental stages of *Frankliniella occidentalis*. The expression level of TLR6 was confirmed in the larval, pupal, adult male, and adult female stages of *Frankliniella occidentalis*. The expression levels in different developmental stages were normalized using EF1. Three insects were used per experiment. The results thereof are shown in FIG. 7. Different letters above the standard deviation bars indicate that there are significant differences between the mean values at a type I error of 0.05 (LSD test).

As shown in the results of FIG. 7, it is seen that the expression level of TLR6 is high in the order of the female adult, larval, male adult, and pupal stages.

The insecticidal activity of the TLR6-specific dsRNA and that of the dsRNA specific to V-ATPaseA or V-ATPaseB were compared as follows.

The larvae and adults of *Frankliniella occidentalis* were treated with each of the TLR6-specific dsRNA (dsTLR6), the V-ATPase A-specific dsRNA (dsATPaseA), and the V-ATPase B-specific dsRNA (dsATPaseB) at a concentration of 500 ppm. Ten larvae and ten adults of *Frankliniella occidentalis* were used. Then, the mortality was confirmed at 7 DAT. The results thereof are shown in FIG. 8.

Figure 8:
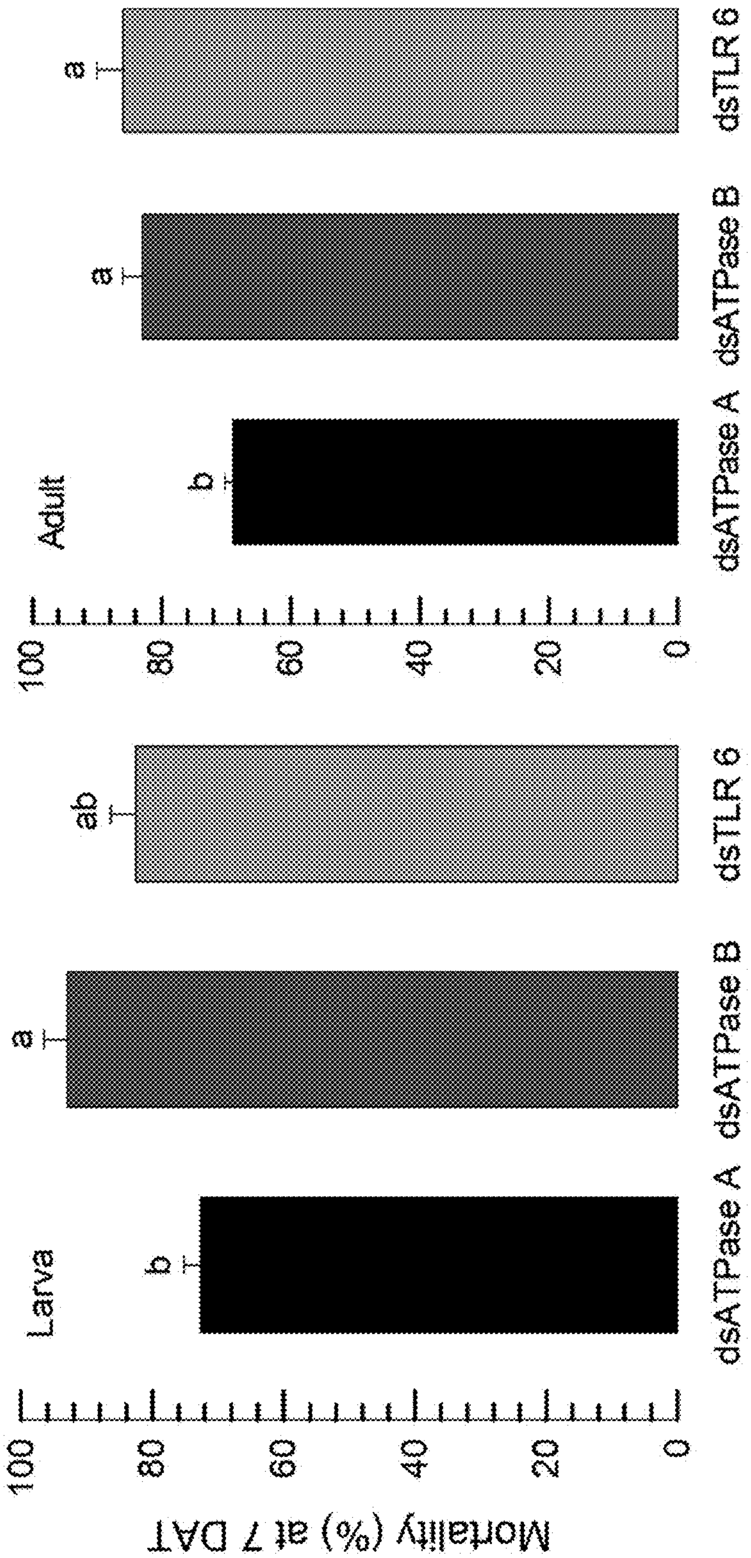
FIG. 8 shows results comparing the insecticidal activity of TLR6-specific dsRNA with that of a dsRNA specific to V-ATPaseA or V-ATPaseB.

As shown in FIG. 8, in both larvae and adults, in the case of treating the V-ATPase B-specific dsRNA (dsATPaseB) or TLR6-specific dsRNA (dsTLR6), the control effect was excellent compared to that in the case of treating the V-ATPase A-specific dsRNA (dsATPaseA).

The control effect depending on the treatment concentration of the V-ATPase B-specific dsRNA (dsATPaseB) and the TLR6-specific dsRNA (dsTLR6), the dsRNAs whose control effects were excellent, was confirmed as follows.

Figure 9:
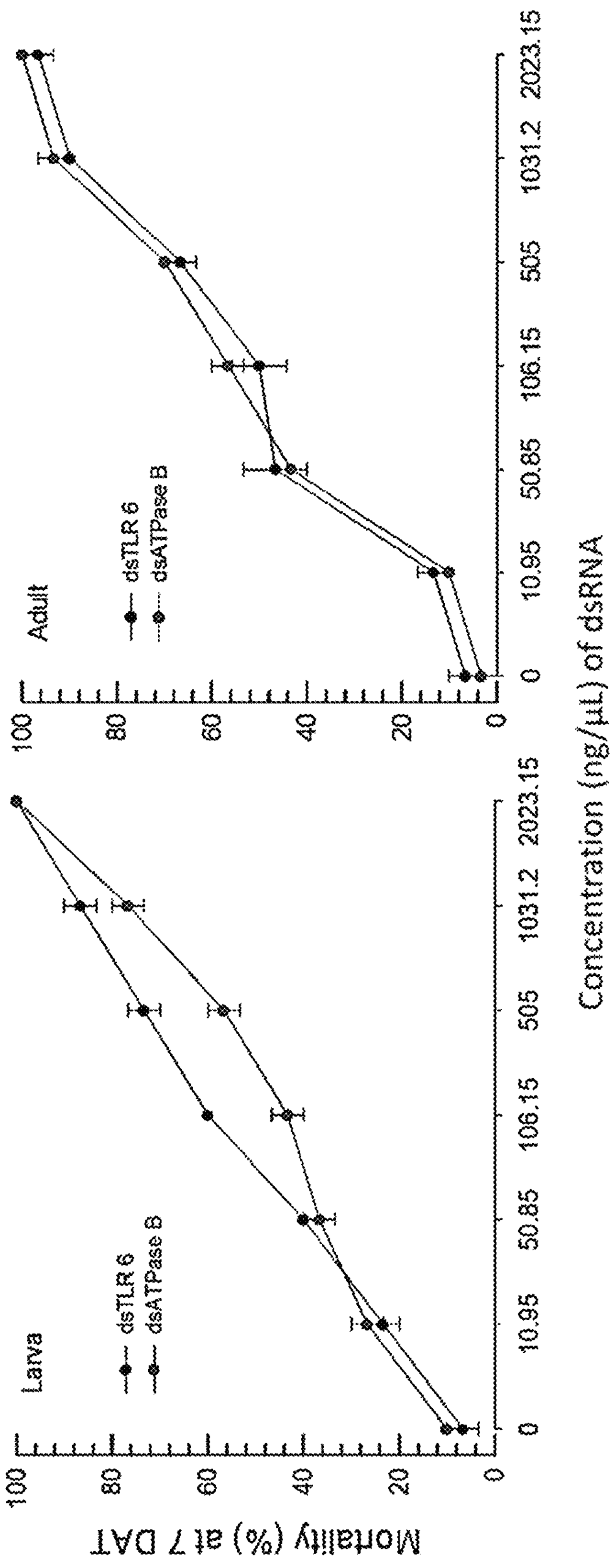
FIG. 9 shows results confirming the control effect depending on the concentration at which a dsRNA specific to V-ATPase B (dsATPaseB) or to TLR6 (dsTLR6) is treated.

The V-ATPase B-specific dsRNA (dsATPaseB) and the TLR6-specific dsRNA (dsTLR6) were used at each concentration of 10.95 μg/ml, 50.85 μg/ml, 106.15 μg/ml, 505 μg/ml, 1031.2 μg/ml, and 2023.15 μg/ml. Each dsRNA suspension was applied to the larvae and adults of *Frankliniella occidentalis* using a feeding method. Ten larvae and ten adults of *Frankliniella occidentalis* were used, and the experiment was repeatedly performed three times. The results confirming the mortality at 7 DAT are shown in FIG. 9. Different letters above the standard deviation bars indicate that there are significant differences between the mean values at a type I error of 0.05 (LSD test).

As shown in the results of FIG. 9, there were no significant dose-dependent differences between these dsRNAs in the larvae (F=5.82; df=1, 28; P=0.0524) and the adults (F=0.08; df=1, 6; P=0.7868).

In addition, the lethal concentration 50 ($LC_{50}$) of the V-ATPase B-specific dsRNA (dsATPaseB) and the TLR6-specific dsRNA (dsTLR6) were compared. The results thereof are shown in Table 11 below.

TABLE 11

| dsRNA | Stage | N | $LC_{50}$ | Slope ± SE | $X^2$ | df | $R^2$ |
|---|---|---|---|---|---|---|---|
| dsTLR6 | Larva | 3 | 3.311 (2.470 to 4.439) | 2.788 ± 0.065 | 0.922 | 4 | 0.951 |
| dsATPaseB | Larva | 3 | 2.665 (2.107 to 3.369) | 3.984 ± 0.052 | 0.976 | 4 | 0.941 |
| dsTLR6 | Adult | 3 | 2.775 (2.085 to 3.674) | 2.998 ± 0.062 | 0.968 | 4 | 0.943 |
| dsATPaseB | Adult | 3 | 2.867 (2.255 to 3.643) | 3.760 ± 0.053 | 0.964 | 4 | 0.924 |

As shown in the results of Table 11, it was confirmed that there was no significant difference in lethal concentration 50 ($LC_{50}$) of the V-ATPase B-specific dsRNA (dsATPaseB) and the TLR6-specific dsRNA (dsTLR6).

Experimental Example 6

Confirmation of Insecticidal Activity of Liposomal Formulation Against *Frankliniella occidentalis*

In order to confirm a method of preventing dsRNAs from being degraded while feeding *Frankliniella occidentalis* a diet, the experiment was performed as follows.

Metafectene™ and EDTA were used as substances added to dsRNA. Metafectene™ or EDTA was added to each of the V-ATPase A-specific dsRNA (dsATPaseA) or the V-ATPaseB-specific dsRNA (dsATPaseB). As a control group, unformulated dsRNA (naked dsRNA) was used.

Figure 10:
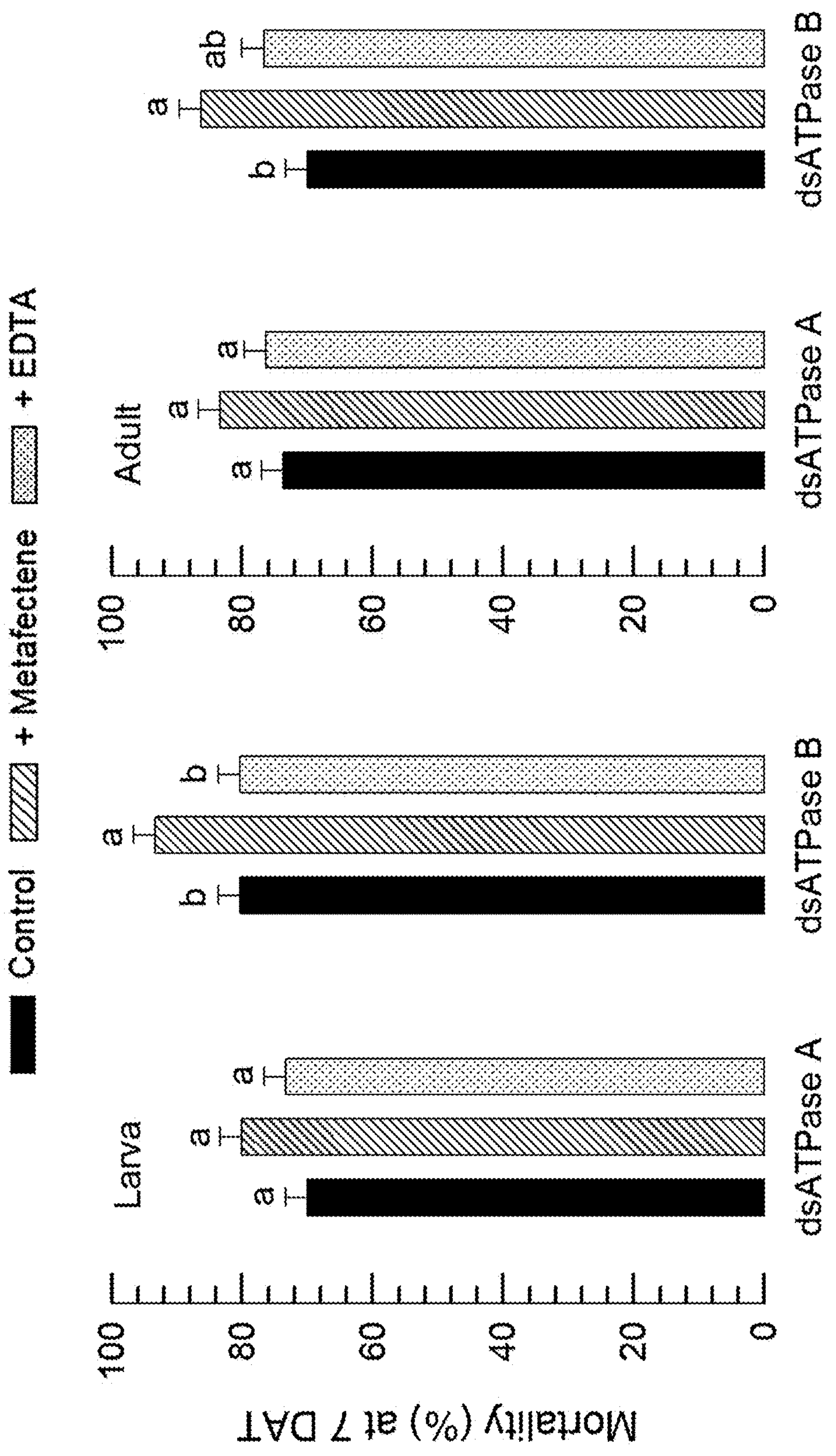
FIG. 10 shows results confirming the control efficacy of a dsRNA against *Frankliniella occidentalis* depending on the types of added substances (Metafectene™ or EDTA)

Liposomes were formed by mixing metafectene, a lipofectin reagent, and the dsRNA suspension in a volume ratio of 1:1. As EDTA, 3% EDTA was added to the dsRNA suspension. All dsRNAs were treated at a concentration of 500 ppm using a feeding assay. Themortality was analyzed: at 7 DAT, and ten larvae or ten adults of *Frankliniella occidentalis* were used during the treatment. The experiment was repeatedly performed three times. The results confirming the control efficacy of the dsRNAs against *Frankliniella occidentalis* depending on the types of additives are shown in FIG. 10. Different letters above the standard deviation bars indicate that there are significant differences between the mean values at a type I error of 0.05 (LSD test).

As shown in the results of FIG. 10, even when adding EDTA to the dsRNAs, the control effects against the larvae or adults of *Frankliniella occidentalis* failed to be significantly increased. However, when forming the liposomal formulation using Metafectene™, the insecticidal activity of the V-ATPaseB-specific dsRNA (dsATPaseB) was significantly increased in both developmental stages, larvae and adults, of *Frankliniella occidentalis*. Even in the case of the V-ATPaseA-specific dsRNA (dsATPaseA), the insecticidal activity was increased when forming liposomes. However, there were no significant differences in the control efficacy, enhanced due to liposome formation, compared to when treated with the dsRNA of the control group.

Experimental Example 7

Analysis of Control Efficacy of V-ATPaseA and V-ATPaseB Against Red Peppers Infected with *Frankliniella occidentalis* in Fields The experiment was conducted in a greenhouse where five rows of young peppers (about 30 cm high) were grown with a row spacing of about 50 cm and a plant spacing of about 40 cm.

Each plant was infected with 80 to 90 *Frankliniella occidentalis* before applying the dsRNA mixture.

Figure 11:
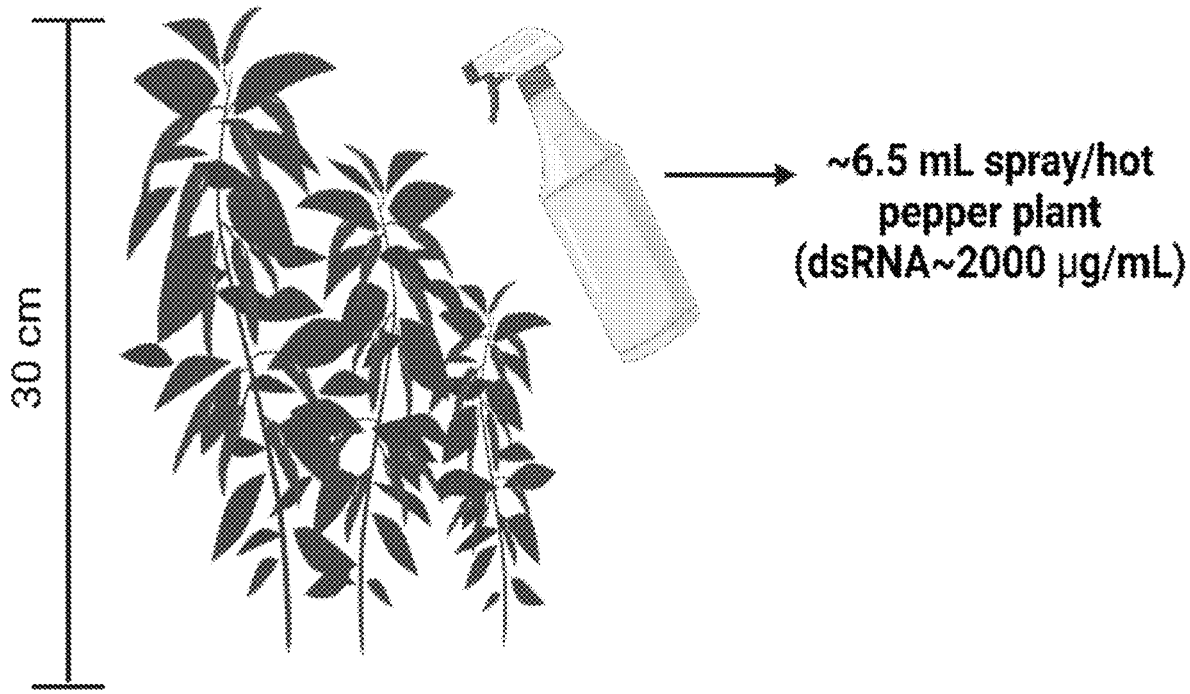
FIG. 11 illustrates a process of spraying a dsRNA onto peppers in a greenhouse.

Liposomal formulations of the dsRNA containing 1, 994.2 μg/ml of dsATPaseA or the dsRNA containing 2,025.1 μg/ml of dsATPaseB were sprayed evenly onto the peppers infected with *Frankliniella occidentalis* at a volume of 6.5 μl per pepper. The same volume of water was sprayed onto the control group. Such a spraying process is shown in FIG. 11.

Each experiment was repeatedly performed according to a randomized complete block design (RCBD), in which each plant was considered as one experimental unit.

The insecticidal rates of the V-ATPaseA-specific dsRNA (dsATPaseA) and the V-ATPase B-specific dsRNA (dsATPaseB) were evaluated at 3 DAT and 7 DAT.

Before spraying the liposomal formulation of the dsRNA, each plant was infested with 88 to 98 *Frankliniella occidentalis*, including both larvae and adults. The effects of the liposomal formulations of dsATPaseA and dsATPaseB at 3 DAT and 7 DAT to control *Frankliniella occidentalis* were compared with that of the control group. The results thereof are shown in Table 12 below.

TABLE 12

| Treatment | Concentration (μg/mL) | Thrips before spraying | Thrips after spraying | Control group (%) |
|---|---|---|---|---|
| | | Day 3 | | |
| Control group | 2,000.0 | 98.25 ± 6.61 | 106.16 ± 7.22 | — |
| dsATPaseA | 1,994.2 | 95.37 ± 10.07 | 87.16 ± 4.82 | 17.27 |
| dsATPaseB | 2,025.1 | 88.11 ± 7.30 | 91.81 ± 3.01 | 13.53 |
| | | Day 7 | | |
| Control group | 2,000.0 | 98.25 ± 6.61 | 128.31 ± 2.05 | — |
| dsATPaseA | 1,994.2 | 95.37 ± 10.07 | 59.62 ± 3.12 | 53.53 |
| dsATPaseB | 2,025.1 | 88.11 ± 7.30 | 56.61 ± 2.32 | 55.88 |

The efficacy of the control group was observed at 3 DAT: while the V-ATPase A-targeting dsRNA showed a control efficacy of 17.27% compared to that of the control group, the V-ATPaseB-targeting dsRNA showed a control efficacy of 13.53% compared to that of the control group. The control efficacy with dsRNA treatment increased at 7 DAT. In addition, the control efficacies of the V-ATPaseA-specific dsRNA and V-ATPaseB-specific dsRNA appeared to be 53.53% and 55.88%, respectively.

Experimental Example 8

Evaluation of Effect of dsATPaseB Against *Frankliniella Occidentalis* and Non-Target Insects Considering the preserved properties and importance of V-ATPases in all organisms, any off-target damage resulting from the dsRNA application is required to be confirmed. Therefore, the target-specific control efficacy of the V-ATPase B-specific dsRNA and the effect of dsATPaseB on non-target insects were evaluated.

*Frankliniella occidentalis* (Fo) was used as the target insect. In addition, *Thrips tabaci* (Tt), *Plutellaxylostella* (Px), *Tenebrio molitor* (Tm), and Triboliumcastaneum (Tc) were used as the non-target insects. *Thrips tabaci, Plutellaxylostella, Tenebrio molitor*, and Triboliumcastaneum were obtained from laboratory cultures. The larvae of these insects were used in bioassays.

A diet treated with 2,000 ppm of the V-ATPaseB-specific dsRNA was fed using green onions for *Thrips tabaci*, cabbages for Plutellaxylostella and *Tenebrio molitor*, and nuts for Triboliumcastanum. In each experiment, ten insects were used, and the experiments were repeatedly performed three times. The mortality was evaluated at 7 DAT under breeding conditions.

Figure 12:
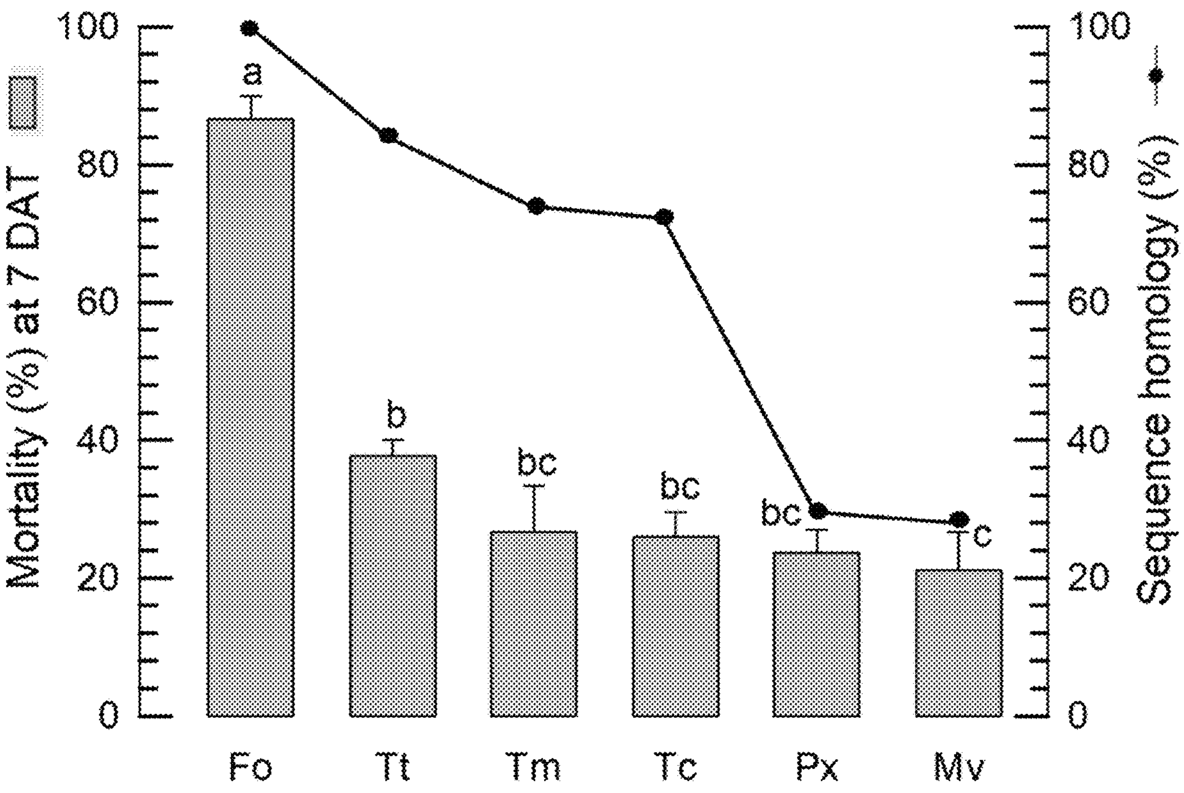
FIG. 12 shows results comparing the control efficacy against five non-target insects with that against *Frankliniella occidentalis*, the results obtained after treating the insects with dsRNA specific to V-ATPaseB.

After being treated with the V-ATPaseB-specific dsRNA, the control efficacy against the five non-target insects was compared with that against *Frankliniella occidentalis*. The results thereof are shown in FIG. 12. Different letters above the standard deviation bars indicate that there are significant differences between the mean values at a type I error of 0.05 (LSD test).

As shown in the results of FIG. 12, when treating *Frankliniella occidentalis* with the V-ATPaseB-specific dsRNA, a control efficacy of 80% or more was confirmed. On the contrary, when treating the other non-target insects with the V-ATPase B-specific dsRNA, a control efficacy of less than 40% was confirmed.

Figure 13:
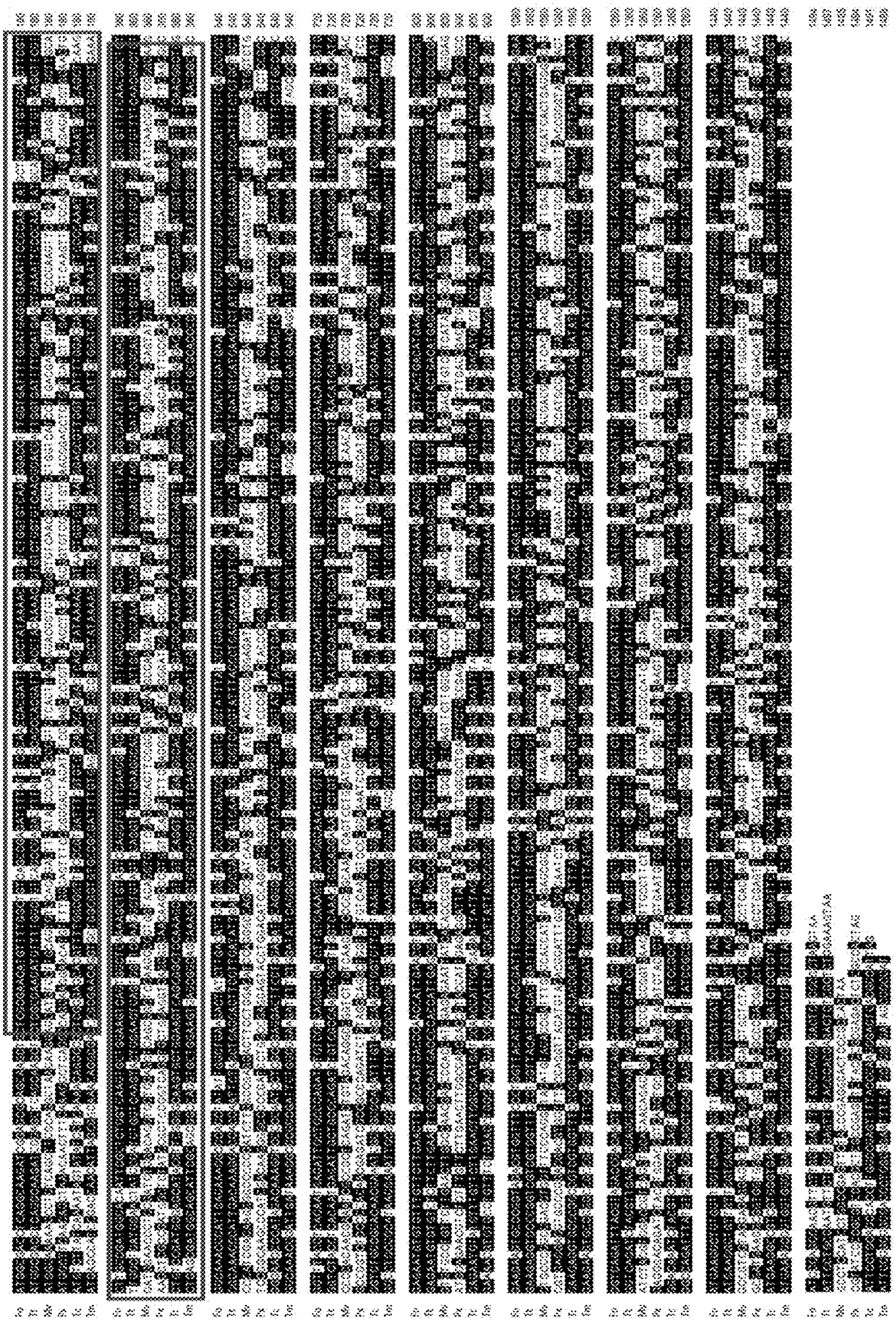
FIG. 13 shows results comparing DNA sequences of dsRNAs corresponding to non-target insects and *Frankliniella occidentalis.*

FIG. 13 shows the results comparing DNA sequences of the dsRNAs corresponding to the non-target insects and *Frankliniella occidentalis*. Although the correlation coefficient was insignificant (P=0.1552), sequence homology was confirmed to show a positive correlation (r=0.6582) with the efficacy of the control group.

When orally feeding the composition for controlling *Frankliniella occidentalis* of the present disclosure to the larvae and adults of *Frankliniella occidentalis*, the dsRNAs are prevented from being degraded by dsRNase in the intestinal lumen of insects. As a result, with the maintained RNAi effect, the corresponding gene expression is inhibited, and excellent insecticidal effects thus can be exhibited. In addition, excellent control effects are obtainable by oral feeding, a simple method involving a process of spraying the composition onto host plants attached by *Frankliniella occidentalis*, so the control method may be widely usable as a new control method of *Frankliniella occidentalis* to replace existing chemical control methods. Especially in the control method of the present disclosure, while the control effect against the target *Frankliniella occidentalis* is excellent, other non-target insects are relatively safe. Therefore, the method is effectively usable in the control of *Frankliniella occidentalis* in fields.

The formulation targeting the V-ATPase for controlling *Frankliniella occidentalis* and the method for controlling *Frankliniella occidentalis* using the same of the present disclosure are disclosed only for illustrative purposes. Those skilled in the art to which the present disclosure belongs will appreciate that various modifications and other equivalent embodiments are possible. It is thus well known that the present disclosure is not limited to the forms mentioned in the above description of the present disclosure. The true technical protection scope of the present disclosure should be defined by the technical spirit of the claims and should be construed as covering the spirit of the present disclosure defined by the claims of the present disclosure and, all modifications, equivalents, and substitutes falling within the scope of the present disclosure. In addition, all terms including technical and scientific terms used herein have the same meaning as commonly understood by those skilled in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

SEQUENCE LISTING

Attachment of electronic file of Sequence listing

What is claimed is:

1. A composition for controlling *Frankliniella occidentalis* comprising:

(a) a double-stranded RNA (dsRNA) specific to one or more subunits selected from the group consisting of V-ATPase-A, V-ATPase-C, V-ATPase-D, V-ATPase-E, V-ATPase-F, V-ATPase-G, and V-ATPase-H, excluding V-ATPase-B, wherein each subunit-specific dsRNA corresponds to a double-stranded nucleotide sequence defined by a primer pair as follows:

SEQ ID NOs: 1 and 2 for subunit A;
SEQ ID NOs: 5 and 6 for subunit C;
SEQ ID NOS: 7 and 8 for subunit D;
SEQ ID NOs: 9 and 10 for subunit E;
SEQ ID NOs: 11 and 12 for subunit F;
SEQ ID NOS: 13 and 14 for subunit G; and
SEQ ID NOs: 15 and 16 for subunit H; and (b) a liposomal carrier comprising a cationic lipid N-[1-(2,3-dioleoyloxy)propyl]-N,N,N-trimethylammonium chloride and a neutral lipid dioleoylphosphatidylethanolamine, wherein the composition is formulated for oral administration by spraying onto host plants consumed by the insect.

2. A method of controlling *Frankliniella occidentalis* by oral feeding, the method comprising: spraying the composition of claim 1 onto a host plant attacked by *Frankliniella occidentalis*.

3. The method of claim 2, wherein the composition is sprayed onto the host plant at a concentration of 1,000 to 3,000 ppm.

4. The method of claim 2, wherein the host plant comprises at least one among a red pepper, a watermelon, a melon, a cucumber, a lily, a carnation, a *chrysanthemum*, a *gerbera*, a rose, a tangerine, an apple, and a peach.

* * * * *

```
                           SEQUENCE LISTING


Sequence total quantity: 16
SEQ ID NO: 1           moltype = DNA  length = 43
FEATURE                Location/Qualifiers
misc_feature           1..43
                       note = forward primer for dsRNA specific to subunit A of
                        vATPase V1 domain of Frankliniella occidentalis
source                 1..43
                       mol_type = other DNA
                       organism = synthetic construct
SEQUENCE: 1
taatacgact cactataggg agatgacggt atccaacgtc cac                    43

SEQ ID NO: 2           moltype = DNA  length = 43
FEATURE                Location/Qualifiers
misc_feature           1..43
                       note = reverse primer for dsRNA specific to subunit A of
                        vATPase V1 domain of Frankliniella occidentalis
source                 1..43
                       mol_type = other DNA
                       organism = synthetic construct
SEQUENCE: 2
taatacgact cactataggg agatttgacc agtcagcagt ggg                    43

SEQ ID NO: 3           moltype = DNA  length = 43
FEATURE                Location/Qualifiers
misc_feature           1..43
                       note = forward primer for dsRNA specific to subunit B of
                        vATPase V1 domain of Frankliniella occidentalis
source                 1..43
                       mol_type = other DNA
                       organism = synthetic construct
SEQUENCE: 3
taatacgact cactataggg agactcgcga acatgttttg gct                    43

SEQ ID NO: 4           moltype = DNA  length = 43
FEATURE                Location/Qualifiers
misc_feature           1..43
                       note = reverse primer for dsRNA specific to subunit B of
                        vATPase V1 domain of Frankliniella occidentalis
source                 1..43
                       mol_type = other DNA
                       organism = synthetic construct
SEQUENCE: 4
taatacgact cactataggg agagagccgt tgaaaacacg acc                    43

SEQ ID NO: 5           moltype = DNA  length = 43
FEATURE                Location/Qualifiers
misc_feature           1..43
                       note = forward primer for dsRNA specific to subunit C of
                        vATPase V1 domain of Frankliniella occidentalis
source                 1..43
                       mol_type = other DNA
                       organism = synthetic construct
SEQUENCE: 5
taatacgact cactataggg agagaacttg gcagacctcg tga                    43

SEQ ID NO: 6           moltype = DNA  length = 43
FEATURE                Location/Qualifiers
misc_feature           1..43
                       note = reverse primer for dsRNA specific to subunit C of
                        vATPase V1 domain of Frankliniella occidentalis
source                 1..43
                       mol_type = other DNA
                       organism = synthetic construct
SEQUENCE: 6
taatacgact cactataggg agaagttgac aggcaggcca tac                    43
```

```
SEQ ID NO: 7           moltype = DNA  length = 43
FEATURE                Location/Qualifiers
misc_feature           1..43
                       note = forward primer for dsRNA specific to subunit D of
                        vATPase V1 domain of Frankliniella occidentalis
source                 1..43
                       mol_type = other DNA
                       organism = synthetic construct
SEQUENCE: 7
taatacgact cactataggg agagaagccg ctttctctct tgc                    43

SEQ ID NO: 8           moltype = DNA  length = 43
FEATURE                Location/Qualifiers
misc_feature           1..43
                       note = reverse primer for dsRNA specific to subunit D of
                        vATPase V1 domain of Frankliniella occidentalis
source                 1..43
                       mol_type = other DNA
                       organism = synthetic construct
SEQUENCE: 8
taatacgact cactataggg agatgacagc tgcctggtag ttc                    43

SEQ ID NO: 9           moltype = DNA  length = 43
FEATURE                Location/Qualifiers
misc_feature           1..43
                       note = forward primer for dsRNA specific to subunit E of
                        vATPase V1 domain of Frankliniella occidentalis
source                 1..43
                       mol_type = other DNA
                       organism = synthetic construct
SEQUENCE: 9
taatacgact cactataggg agaagtccaa cagcaacgtc tga                    43

SEQ ID NO: 10          moltype = DNA  length = 43
FEATURE                Location/Qualifiers
misc_feature           1..43
                       note = reverse primer for dsRNA specific to subunit E of
                        vATPase V1 domain of Frankliniella occidentalis
source                 1..43
                       mol_type = other DNA
                       organism = synthetic construct
SEQUENCE: 10
taatacgact cactataggg agactcccaa acgtctcctt gct                    43

SEQ ID NO: 11          moltype = DNA  length = 44
FEATURE                Location/Qualifiers
misc_feature           1..44
                       note = forward primer for dsRNA specific to subunit F of
                        vATPase V1 domain of Frankliniella occidentalis
source                 1..44
                       mol_type = other DNA
                       organism = synthetic construct
SEQUENCE: 11
taatacgact cactataggg agaaccgcca acccaatttt atgg                   44

SEQ ID NO: 12          moltype = DNA  length = 42
FEATURE                Location/Qualifiers
misc_feature           1..42
                       note = reverse primer for dsRNA specific to subunit F of
                        vATPase V1 domain of Frankliniella occidentalis
source                 1..42
                       mol_type = other DNA
                       organism = synthetic construct
SEQUENCE: 12
taatacgact cactataggg agaggttgaa catgcccttc gc                     42

SEQ ID NO: 13          moltype = DNA  length = 43
FEATURE                Location/Qualifiers
misc_feature           1..43
                       note = forward primer for dsRNA specific to subunit G of
                        vATPase V1 domain of Frankliniella occidentalis
source                 1..43
                       mol_type = other DNA
                       organism = synthetic construct
SEQUENCE: 13
taatacgact cactataggg agacgtttga agcaggcaaa gga                    43

SEQ ID NO: 14          moltype = DNA  length = 43
FEATURE                Location/Qualifiers
```

-continued

```
misc_feature          1..43
                      note = reverse primer for dsRNA specific to subunit G of
                       vATPase V1 domain of Frankliniella occidentalis
source                1..43
                      mol_type = other DNA
                      organism = synthetic construct
SEQUENCE: 14
taatacgact cactataggg agatggtgtc agcttcaatg cga                 43

SEQ ID NO: 15         moltype = DNA  length = 43
FEATURE               Location/Qualifiers
misc_feature          1..43
                      note = forward primer for dsRNA specific to subunit H of
                       vATPase V1 domain of Frankliniella occidentalis
source                1..43
                      mol_type = other DNA
                      organism = synthetic construct
SEQUENCE: 15
taatacgact cactataggg agagaacgaa cgtttgcagg ctt                 43

SEQ ID NO: 16         moltype = DNA  length = 43
FEATURE               Location/Qualifiers
misc_feature          1..43
                      note = reverse primer for dsRNA specific to subunit H of
                       vATPase V1 domain of Frankliniella occidentalis
source                1..43
                      mol_type = other DNA
                      organism = synthetic construct
SEQUENCE: 16
taatacgact cactataggg agactccctc cagaattgag ccg                 43
```